(12) United States Patent
Irwin et al.

(10) Patent No.: US 12,498,049 B2
(45) Date of Patent: Dec. 16, 2025

(54) ZONE CONTROL DEVICES, SYSTEMS AND METHODS

(71) Applicant: Rain Bird Corporation, Azusa, CA (US)

(72) Inventors: Kevin Mark Irwin, Tucson, AZ (US); Brian Allen Biang, Washington, DC (US); Michael Joseph Millius, Vail, AZ (US); Paul Gregory Dailey, Tucson, AZ (US); Riccardo J. Tresso, Oro Valley, AZ (US); Leilanny Bujanda, Tucson, AZ (US); Brian C. Hoover, Tucson, AZ (US); Pedro Alejandro Raygoza Flores, Tucson, AZ (US); Kevin James Markley, Tucson, AZ (US); Michael A. McAfee, Tucson, AZ (US)

(73) Assignee: Rain Bird Corporation, Azusa, CA (US)

( * ) Notice: Subject to any disclaimer, the term of this patent is extended or adjusted under 35 U.S.C. 154(b) by 8 days.

(21) Appl. No.: 18/621,961

(22) Filed: Mar. 29, 2024

(65) Prior Publication Data
US 2025/0305590 A1 Oct. 2, 2025

(51) Int. Cl.
*F16K 15/18* (2006.01)
*G05D 16/20* (2006.01)

(52) U.S. Cl.
CPC ..... *F16K 15/1825* (2021.08); *G05D 16/2022* (2019.01); *F16K 2200/402* (2021.08)

(58) Field of Classification Search
CPC .......... F16K 15/1825; F16K 2200/402; G05D 16/2022
See application file for complete search history.

(56) References Cited

U.S. PATENT DOCUMENTS

| | | | |
|---|---|---|---|
| 1,035,225 | A | 8/1912 | Nuebling |
| 1,145,222 | A | 7/1915 | James |

(Continued)

FOREIGN PATENT DOCUMENTS

| | | |
|---|---|---|
| CN | 1816735 | 8/2006 |
| EP | 0188131 | 7/1986 |

(Continued)

OTHER PUBLICATIONS

USPTO; U.S. Appl. No. 18/166,170; Non-Final Rejection mailed Dec. 13, 2024; (pp. 1-13).

(Continued)

*Primary Examiner* — P. Macade Nichols
(74) *Attorney, Agent, or Firm* — Fitch, Even, Tabin & Flannery, LLP

(57) ABSTRACT

Zone control devices that integrate a valve, filter, and pressure regulator within a single device are provided. Specifically, the zone control devices include a main body having a base portion with an inlet passage and an outlet passage attachable to a conduit and a body portion extending from the base portion having an interior for receiving a filter. The zone control devices further include a valve bonnet including a solenoid bowl for attaching a solenoid. In some embodiments, an adapter removably couples the valve bonnet to the main body of the zone control device and forms an interface between the valve bonnet and the main body to operate the valve. The zone control devices also may include a pressure regulator in the vent flow path positioned in a vent flow path of the valve bonnet downstream of the solenoid for regulating pressure at the valve. In embodiments, the vent flow path is positioned to vent fluid into the main body downstream of the filter.

22 Claims, 26 Drawing Sheets

(56) References Cited

U.S. PATENT DOCUMENTS

| | | |
|---|---|---|
| 1,972,054 A | 8/1934 | Moller |
| 2,519,805 A | 8/1950 | Wilkins |
| 2,674,880 A | 4/1954 | Charles |
| 2,929,248 A | 3/1960 | Sprenkle |
| 2,981,240 A | 4/1961 | Nelson |
| 3,049,009 A | 8/1962 | McCall |
| 3,071,160 A | 1/1963 | Weichbrod |
| 3,076,335 A | 2/1963 | Rosaen |
| 3,076,336 A | 2/1963 | Rosaen |
| 3,186,597 A | 6/1965 | William |
| 3,204,659 A | 9/1965 | Richards |
| 3,212,685 A | 10/1965 | Richard |
| 3,260,110 A | 7/1966 | Lutz |
| 3,354,718 A | 11/1967 | Boutillon |
| 3,472,072 A | 10/1969 | Kunstadt |
| 3,623,776 A | 11/1971 | Wellman |
| 3,641,817 A | 2/1972 | Dory |
| 3,667,495 A | 6/1972 | Schuler |
| 3,709,037 A | 1/1973 | Abbotts |
| 3,721,505 A | 3/1973 | Garnett |
| 3,733,898 A | 5/1973 | Yamamoto |
| 3,748,837 A | 7/1973 | Billeter |
| 3,757,577 A | 9/1973 | Bozek |
| 3,759,099 A | 9/1973 | McGregor |
| 3,789,664 A | 2/1974 | Bozek |
| 3,812,715 A | 5/1974 | Whalen |
| 3,822,591 A | 7/1974 | Li |
| 3,842,671 A | 10/1974 | Frizelle |
| 3,853,144 A | 12/1974 | Whelan |
| 3,874,235 A | 4/1975 | Sanden |
| 3,945,686 A | 3/1976 | Orzel |
| 3,948,285 A | 4/1976 | Flynn |
| 3,978,880 A | 9/1976 | Crown |
| 3,979,955 A | 9/1976 | Schulte |
| 3,990,299 A | 11/1976 | Coffman |
| 4,080,997 A | 3/1978 | Biornstad |
| 4,089,215 A | 5/1978 | Chapin |
| 4,195,518 A | 4/1980 | Fees |
| 4,226,259 A | 10/1980 | Szekely |
| 4,248,099 A | 2/1981 | Allen, Jr. |
| 4,250,553 A | 2/1981 | Sebens |
| 4,254,664 A | 3/1981 | Graham |
| 4,282,761 A | 8/1981 | Rosaen |
| 4,292,853 A | 10/1981 | Williams |
| 4,308,746 A | 1/1982 | Covington |
| 4,311,170 A | 1/1982 | Dolan |
| 4,337,786 A | 7/1982 | Myers |
| 4,361,280 A | 11/1982 | Rosenberg |
| 4,368,646 A | 1/1983 | Rogg |
| 4,388,835 A | 6/1983 | Rosaen |
| 4,389,901 A | 6/1983 | Lake |
| 4,440,028 A | 4/1984 | Ramlow |
| 4,501,972 A | 2/1985 | Foerster, Jr. |
| 4,518,955 A | 5/1985 | Meyer |
| 4,619,139 A | 10/1986 | Rosaen |
| 4,630,486 A | 12/1986 | Miles |
| 4,630,488 A | 12/1986 | Marlier |
| 4,635,485 A | 1/1987 | Lew |
| 4,651,286 A | 3/1987 | Fukai |
| 4,724,706 A | 2/1988 | Stiever |
| 4,790,195 A | 12/1988 | Feller |
| 4,805,862 A | 2/1989 | Wissman |
| 4,838,310 A | 6/1989 | Scott |
| 4,840,072 A | 6/1989 | Cuthbert |
| 4,840,195 A | 6/1989 | Zabrenski |
| 4,859,157 A | 8/1989 | Adler |
| 4,867,198 A | 9/1989 | Faust |
| 4,898,205 A | 2/1990 | Ross |
| 4,913,352 A | 4/1990 | Witty |
| 4,945,771 A | 8/1990 | Ogden |
| 4,986,133 A | 1/1991 | Lake |
| 4,991,436 A | 2/1991 | Roling |
| 5,000,031 A | 3/1991 | Potvin |
| 5,018,386 A | 5/1991 | Zeoli |
| 5,085,076 A | 2/1992 | Engelmann |
| 5,137,556 A | 8/1992 | Koulogeorgas |
| 5,230,366 A | 7/1993 | Marandi |
| 5,257,646 A | 11/1993 | Meyer |
| 5,261,268 A | 11/1993 | Namba |
| 5,303,738 A | 4/1994 | Chang |
| 5,337,615 A | 8/1994 | Goss |
| 5,377,529 A | 1/1995 | Boyd |
| 5,383,338 A | 1/1995 | Bowsky |
| 5,415,041 A | 5/1995 | Foran, Jr. |
| 5,456,285 A | 10/1995 | Lee |
| 5,483,838 A | 1/1996 | Holden |
| 5,509,407 A | 4/1996 | Schuler |
| 5,515,734 A | 5/1996 | Malminen |
| 5,540,107 A | 7/1996 | Silverman |
| 5,544,533 A | 8/1996 | Sugi |
| 5,546,801 A | 8/1996 | Swinson |
| 5,554,805 A | 9/1996 | Bahrton |
| 5,560,542 A | 10/1996 | Reid |
| 5,568,825 A | 10/1996 | Faulk |
| 5,596,152 A | 1/1997 | Bergervoet |
| 5,642,861 A | 7/1997 | Ogi |
| 5,645,264 A | 7/1997 | Kah |
| 5,655,561 A | 8/1997 | Wendel |
| 5,713,729 A | 2/1998 | Hong |
| 5,779,148 A | 7/1998 | Saarem |
| 5,806,558 A | 9/1998 | Greverath |
| 5,831,176 A | 11/1998 | Morgenthale |
| 5,853,026 A | 12/1998 | Wlodarczyk |
| 5,875,815 A | 3/1999 | Ungerecht |
| 5,877,417 A | 3/1999 | Arvidson |
| 5,880,378 A | 3/1999 | Behring, II |
| 5,881,757 A | 3/1999 | Kuster |
| 5,937,908 A | 8/1999 | Inoshiri |
| 5,938,372 A | 8/1999 | Lichfield |
| 5,979,863 A | 11/1999 | Lousberg |
| 5,986,573 A | 11/1999 | Franklin |
| 5,992,465 A | 11/1999 | Jansen |
| 6,032,541 A | 3/2000 | Haak |
| 6,106,705 A | 8/2000 | Giordano |
| 6,139,727 A | 10/2000 | Lockwood |
| 6,202,683 B1 | 3/2001 | Smith |
| 6,209,576 B1 | 4/2001 | Davis |
| 6,240,336 B1 | 5/2001 | Brundisini |
| 6,244,844 B1 | 6/2001 | Diaz |
| 6,250,151 B1 | 6/2001 | Tingleff |
| 6,267,006 B1 | 7/2001 | Bugli |
| 6,284,129 B1 | 9/2001 | Giordano |
| 6,296,227 B1 | 10/2001 | Burcham |
| 6,302,146 B1 | 10/2001 | McHugh |
| 6,336,361 B1 | 1/2002 | Uramachi |
| 6,341,622 B1 | 1/2002 | Mchugh |
| 6,345,541 B1 | 2/2002 | Hendey |
| D458,554 S | 6/2002 | Jolly |
| 6,460,563 B2 | 10/2002 | Olson |
| 6,502,602 B1 | 1/2003 | Stroup |
| 6,513,375 B2 | 2/2003 | Uramachi |
| 6,517,707 B2 | 2/2003 | Giordano |
| 6,552,647 B1 | 4/2003 | Thiessen |
| 6,558,078 B2 | 5/2003 | Sowry |
| 6,575,307 B2 | 6/2003 | Lockwood |
| 6,627,077 B2 | 9/2003 | Fritsch |
| 6,648,240 B2 | 11/2003 | Simmons |
| 6,666,384 B2 | 12/2003 | Prandi |
| 6,705,489 B2 | 3/2004 | Henry |
| 6,729,182 B2 | 5/2004 | Uramachi |
| 6,749,136 B1 | 6/2004 | Wilson |
| 6,755,210 B2 | 6/2004 | Suzuki |
| 6,758,104 B2 | 7/2004 | Leys |
| 6,807,855 B2 | 10/2004 | Stroup |
| 6,810,910 B2 | 11/2004 | McHugh |
| 6,812,848 B2 | 11/2004 | Candela |
| 6,834,662 B1 | 12/2004 | Olson |
| 6,845,886 B2 | 1/2005 | Henry |
| 6,874,534 B2 | 4/2005 | Diana |
| 6,923,205 B2 | 8/2005 | Callies |
| 6,926,821 B2 | 8/2005 | Giordano |
| 6,959,611 B2 | 11/2005 | Schehl |
| 6,973,705 B2 | 12/2005 | Leys |
| 6,983,761 B2 | 1/2006 | Henley |

(56) References Cited

U.S. PATENT DOCUMENTS

| | | |
|---|---|---|
| 7,004,677 B1 | 2/2006 | Ericksen |
| 7,011,254 B2 | 3/2006 | Thornton |
| 7,030,767 B2 | 4/2006 | Candela |
| 7,032,435 B2 | 4/2006 | Hassenflug |
| 7,069,944 B2 | 7/2006 | Morikawa |
| 7,121,477 B1 | 10/2006 | Noelke |
| 7,130,750 B1 | 10/2006 | Stevens |
| 7,143,992 B2 | 12/2006 | Sassone |
| 7,159,612 B2 | 1/2007 | Henley |
| 7,185,548 B2 | 3/2007 | Penlerick |
| 7,218,237 B2 | 5/2007 | Kates |
| 7,240,693 B2 | 7/2007 | Knop |
| 7,290,680 B2 | 11/2007 | Henry |
| 7,293,721 B2 | 11/2007 | Roberts |
| 7,306,008 B2 | 12/2007 | Tornay |
| 7,311,005 B2 | 12/2007 | Wiesinger |
| 7,322,231 B2 | 1/2008 | Trygg |
| 7,401,622 B2 | 7/2008 | Ungerecht |
| 7,404,686 B2 | 7/2008 | Volum |
| 7,418,976 B2 | 9/2008 | Henley |
| 7,438,083 B2 | 10/2008 | Feith |
| 7,454,984 B1 | 11/2008 | Ross |
| 7,475,863 B2 | 1/2009 | Donovan |
| 7,546,778 B2 | 6/2009 | Amante |
| 7,561,057 B2 | 7/2009 | Kates |
| 7,583,198 B2 | 9/2009 | Kates |
| 7,628,910 B2 | 12/2009 | Lockwood |
| 7,658,105 B2 | 2/2010 | Holz |
| 7,681,807 B2 | 3/2010 | Gregory |
| 7,694,934 B2 | 4/2010 | Irwin |
| 7,806,382 B1 | 10/2010 | Palumbo |
| 7,819,020 B2 | 10/2010 | Jacobi |
| 7,852,487 B2 | 12/2010 | Rembe |
| 7,891,370 B1 | 2/2011 | Stange |
| 7,900,647 B2 | 3/2011 | Tornay |
| 7,926,746 B2 | 4/2011 | Melton |
| 8,104,340 B2 | 1/2012 | Speldrich |
| 8,113,225 B2 | 2/2012 | Funari |
| RE43,334 E | 5/2012 | Simmons |
| 8,187,471 B2 | 5/2012 | Lockwood |
| 8,256,744 B2 | 9/2012 | Tanikawa |
| 8,297,312 B2 | 10/2012 | Tai |
| 8,322,684 B2 | 12/2012 | Otsuka |
| 8,413,681 B2 | 4/2013 | Schmuckle |
| 8,434,634 B2 | 5/2013 | Bork |
| 8,439,282 B2 | 5/2013 | Allen |
| 8,534,467 B2 | 9/2013 | Haas |
| 8,662,005 B2 | 3/2014 | Chen |
| 8,733,397 B2 | 5/2014 | Otsuka |
| 8,800,384 B2 | 8/2014 | Wootten |
| 8,833,390 B2 | 9/2014 | Ball |
| 8,833,672 B2 | 9/2014 | Skripkar |
| 8,839,821 B2 | 9/2014 | Pinkerton |
| 8,866,634 B2 | 10/2014 | Williamson |
| 8,888,711 B2 | 11/2014 | Allum |
| 8,918,293 B2 | 12/2014 | Carmichael |
| 8,919,678 B2 | 12/2014 | Beer |
| 9,004,097 B2 | 4/2015 | Crawford |
| 9,010,360 B1 | 4/2015 | Older |
| 9,021,854 B2 | 5/2015 | Godel |
| 9,032,998 B2 | 5/2015 | O'Brien |
| 9,120,116 B2 | 9/2015 | Gorman |
| 9,140,255 B2 | 9/2015 | Wetherill |
| 9,140,377 B2 | 9/2015 | Becker |
| 9,275,536 B2 | 3/2016 | Wetherill |
| 9,296,004 B1 | 3/2016 | Clark |
| 9,322,682 B2 | 4/2016 | White |
| 9,354,095 B2 | 5/2016 | Sorenson |
| 9,366,595 B2 | 6/2016 | Bourgeois |
| 9,375,166 B2 | 6/2016 | Allum |
| 9,393,586 B2 | 7/2016 | Donner |
| 9,410,636 B2 | 8/2016 | Older |
| 9,439,365 B2 | 9/2016 | Lo |
| 9,470,562 B2 | 10/2016 | Frisch |
| 9,476,517 B2 | 10/2016 | Gomes, II |
| 9,494,249 B2 | 11/2016 | McCraven |
| 9,494,480 B2 | 11/2016 | Klicpera |
| 9,506,785 B2 | 11/2016 | Turk |
| 9,512,946 B2 | 12/2016 | Karasawa |
| 9,541,107 B2 | 1/2017 | Sawchuk |
| 9,574,923 B2 | 2/2017 | Williamson |
| 9,597,699 B2 | 3/2017 | Helmsderfer |
| 9,668,432 B2 | 6/2017 | Roess |
| 9,699,974 B2 | 7/2017 | Clark |
| 9,700,903 B2 | 7/2017 | Kawamori |
| 9,713,438 B2 | 7/2017 | Allum |
| 9,724,708 B2 | 8/2017 | Helmsderfer |
| 9,749,792 B2 | 8/2017 | Klicpera |
| 9,772,045 B2 | 9/2017 | Dietel |
| 9,781,886 B1 | 10/2017 | Wangsgaard |
| 9,795,094 B2 | 10/2017 | Roess |
| 9,805,588 B2 | 10/2017 | Gritzo |
| 9,821,335 B2 | 11/2017 | Burrous |
| 9,832,939 B2 | 12/2017 | Russell |
| 9,835,266 B2 | 12/2017 | Picht |
| 9,847,265 B2 | 12/2017 | Donner |
| 9,857,805 B2 | 1/2018 | Halimi |
| 9,909,680 B2 | 3/2018 | McCraven |
| 9,950,285 B2 | 4/2018 | Yoshida |
| 10,039,240 B2 | 8/2018 | Darnold |
| 10,119,537 B2 | 11/2018 | Wetherill |
| 10,300,903 B2 | 5/2019 | Stiatti |
| 10,309,432 B2 | 6/2019 | Reckner |
| 10,473,494 B2 | 11/2019 | Allen |
| 10,612,682 B1 | 4/2020 | Moore |
| 10,634,538 B2 | 4/2020 | Allen |
| 10,648,842 B2 | 5/2020 | Croteau |
| 10,655,999 B2 | 5/2020 | Ball |
| 10,662,907 B2 | 5/2020 | Dirnberger |
| 10,662,936 B2 | 5/2020 | Ham |
| 10,663,984 B2 | 5/2020 | Kilcran |
| 10,719,089 B2 | 7/2020 | Imsland |
| 10,758,923 B1 | 9/2020 | Oman |
| 10,782,163 B2 | 9/2020 | Vromans |
| 10,830,632 B2 | 11/2020 | Elliott |
| 10,871,240 B2 | 12/2020 | McCraven |
| 10,906,052 B2 | 2/2021 | Greenwood |
| 10,939,626 B2 | 3/2021 | Kremicki |
| 10,955,270 B2 | 3/2021 | Al-Ali |
| 10,980,120 B2 | 4/2021 | Kwak |
| 11,015,967 B2 | 5/2021 | Ball |
| 11,118,953 B2 | 9/2021 | Croteau |
| 11,126,208 B2 | 9/2021 | Nelson |
| 11,126,209 B1 | 9/2021 | Weingarten |
| 11,224,830 B2 | 1/2022 | Wildermuth |
| 11,281,241 B2 | 3/2022 | Weingarten |
| 11,281,242 B2 | 3/2022 | Weingarten |
| 11,338,226 B2 | 5/2022 | Dieker |
| 11,391,392 B2 | 7/2022 | Niess |
| 11,408,515 B2 | 8/2022 | Greenwood |
| 11,458,942 B2 | 10/2022 | Schulz |
| 11,511,290 B2 | 11/2022 | Greenwood |
| 11,649,895 B2 | 5/2023 | Arno |
| 11,662,242 B2 | 5/2023 | Allen |
| 11,827,530 B2 | 11/2023 | Itai |
| 2002/0059836 A1 | 5/2002 | Dodsworth |
| 2002/0092926 A1 | 7/2002 | Thornton |
| 2002/0144952 A1 | 10/2002 | Saxton |
| 2004/0073524 A1 | 4/2004 | Smith |
| 2005/0011554 A1 | 1/2005 | Davila |
| 2005/0067049 A1 | 3/2005 | Fima |
| 2005/0195078 A1 | 9/2005 | Basinger |
| 2005/0211608 A1 | 9/2005 | Lockwood |
| 2005/0224118 A1 | 10/2005 | Tornay |
| 2005/0229716 A1 | 10/2005 | Unsworth |
| 2005/0230650 A1 | 10/2005 | Peterson |
| 2005/0279169 A1 | 12/2005 | Lander |
| 2006/0005620 A1 | 1/2006 | Koike |
| 2006/0027267 A1 | 2/2006 | Fritze |
| 2006/0086833 A1 | 4/2006 | Roberts |
| 2006/0102236 A1 | 5/2006 | Phillips |
| 2006/0202051 A1 | 9/2006 | Parsons |
| 2006/0267758 A1 | 11/2006 | Barth |
| 2007/0026216 A1 | 2/2007 | Weingartner et al. |

(56) References Cited

U.S. PATENT DOCUMENTS

| | | |
|---|---|---|
| 2007/0119974 A1 | 5/2007 | Johnson |
| 2007/0138319 A1 | 6/2007 | Thornton |
| 2007/0194150 A1 | 8/2007 | Ericksen |
| 2007/0262168 A1 | 11/2007 | Ericksen |
| 2007/0272307 A1 | 11/2007 | Patterson |
| 2008/0029722 A1 | 2/2008 | Irwin |
| 2008/0173084 A1 | 7/2008 | Wiesinger |
| 2008/0190214 A1 | 8/2008 | Ubowski |
| 2008/0230146 A1 | 9/2008 | Kastner |
| 2008/0285049 A1 | 11/2008 | Rembe |
| 2009/0085756 A1 | 4/2009 | Atassi |
| 2009/0091461 A1 | 4/2009 | Kim |
| 2009/0095935 A1 | 4/2009 | Wlodarczyk |
| 2009/0229675 A1 | 9/2009 | Hoskisson |
| 2009/0283160 A1 | 11/2009 | Fishwick |
| 2009/0301173 A1 | 12/2009 | Lamberti |
| 2009/0320608 A1 | 12/2009 | Marcu |
| 2010/0045471 A1 | 2/2010 | Meyers |
| 2010/0071458 A1 | 3/2010 | Wiedenhoefer |
| 2010/0289652 A1 | 11/2010 | Javey |
| 2012/0125452 A1 | 5/2012 | Drechsel |
| 2012/0216895 A1 | 8/2012 | Fishwick |
| 2013/0008542 A1 | 1/2013 | Irwin |
| 2013/0112003 A1 | 5/2013 | Yamauchi |
| 2014/0338464 A1 | 11/2014 | Ball |
| 2015/0013220 A1 | 1/2015 | Ross |
| 2015/0097059 A1 | 4/2015 | Helmsderfer |
| 2015/0298145 A1 | 10/2015 | Sauser |
| 2016/0113220 A1 | 4/2016 | Walker |
| 2016/0163177 A1 | 6/2016 | Klicpera |
| 2016/0197467 A1 | 7/2016 | Stepp |
| 2016/0219805 A1 | 8/2016 | Romney |
| 2016/0288156 A1 | 10/2016 | Donner |
| 2016/0345515 A1 | 12/2016 | Helmsderfer |
| 2016/0377464 A1 | 12/2016 | Adlon |
| 2017/0059075 A1 | 3/2017 | Ueno |
| 2017/0061727 A1 | 3/2017 | Savaëte |
| 2017/0204820 A1 | 7/2017 | Dirnberger |
| 2017/0259226 A1 | 9/2017 | Bayer |
| 2017/0318761 A1 | 11/2017 | Rainone |
| 2017/0333919 A1 | 11/2017 | Helmsderfer |
| 2017/0345728 A1 | 11/2017 | Donner |
| 2017/0370754 A1 | 12/2017 | Croteau |
| 2018/0017423 A1 | 1/2018 | Allen |
| 2018/0087937 A1 | 3/2018 | Al-Ali |
| 2018/0106655 A1 | 4/2018 | Kilcran |
| 2018/0136673 A1 | 5/2018 | Halimi |
| 2018/0172537 A1 | 6/2018 | Cimberio |
| 2018/0220600 A1 | 8/2018 | Russell |
| 2018/0259982 A1 | 9/2018 | Halimi |
| 2018/0274212 A1 | 9/2018 | Kuchly |
| 2018/0338435 A1 | 11/2018 | Darnold |
| 2019/0120671 A1 | 4/2019 | Allen |
| 2019/0212180 A1 | 7/2019 | Stetsenko |
| 2019/0323625 A1 | 10/2019 | Niess |
| 2020/0029515 A1 | 1/2020 | Henry |
| 2020/0200290 A1 | 6/2020 | Busch |
| 2020/0209040 A1 | 7/2020 | Allen |
| 2020/0249065 A1 | 8/2020 | Allen |
| 2020/0332906 A1 | 10/2020 | Niess |
| 2021/0404572 A1 | 12/2021 | Nelson |
| 2022/0022391 A1 | 1/2022 | Gazit |
| 2022/0042833 A1 | 2/2022 | Al-Ali |
| 2022/0226851 A1 | 7/2022 | Afshar |
| 2022/0236089 A1 | 7/2022 | Allen |
| 2022/0373096 A1 | 11/2022 | Lenz |
| 2023/0182046 A1 | 6/2023 | Gilboa |
| 2024/0264615 A1 | 8/2024 | Biang |
| 2024/0293833 A1 | 9/2024 | McAfee |

FOREIGN PATENT DOCUMENTS

| | | |
|---|---|---|
| JP | 10206263 A | 8/1998 |
| JP | 2009063559 A | 3/2009 |
| JP | 2016017756 | 2/2016 |

OTHER PUBLICATIONS

U.S. Appl. No. 15/792,273, filed Oct. 24, 2017, Kirk Andrew Allen.
1998 Polaris RMK 700 Fuel Cap / Gas Gauge, <https://www.ebay.com/itm/1998-POLARIS-RMK-700-Fuel-Cap-Gas-Gauge/283761973379?>, 10 pages, publicly available before Jul. 13, 2015.
Catron, M. Bezel Overview, Rain Bird®, Nov. 16, 2017, 5 pages.
Catron, Mark. Dial Artwork-International: Ted Concept #1a and #1b, Rain Bird®, Jun. 18, 2018, 2 pages.
Catron, Mark. Bezel Artwork Concepts, Rain Bird®, dated Dec. 10, 2017, 8 pages.
Catron, Mark. Bezel Artwork Concepts, Rain Bird®, dated Dec. 4, 2017, 6 pages.
Catron, Mark. Bezel Artwork Overview. Rain Bird®, dated May 25, 2018, 5 pages.
Catron, Mark. Concept 1 and Concept 2, Rain Bird®, Mar. 17, 2018, 2 pages.
Catron, Mark. Dial Artwork—Domestic: Ted Concept #1a, #1b, #2a, and #2b, Rain Bird®, Jun. 10, 2018, 4 pages.
Catron, Mark. Dial Artwork—Domestic: Ted Concept #1a, #1b, and #2, Rain Bird®, Jun. 8, 2018, 3 pages.
Catron, Mark. Dial Artwork—International and Domestic, Rain Bird®, dated Jun. 5, 2018, 2 pages.
FLOWVIS® Flow Meter, H2Flow Controls: Progress Through Innovation ™, <www.h2flow.net>, 2018, 5 pages.
International Search Report and Written Opinion, International Application No. PCT/US2017/042004, dated Sep. 14, 2017, 6 pages.
Owfeel of 3 Dragonfly Toy Plastic Twisty Flying Saucers Spinning Shooter Flying Disc Toys, <https://www.amazon.com/Owfeel-Dragonfly-Spinning-Children-Randomly/dp/BOOIDUPUY0>, at least prior to Jul. 13, 2017, 1 page.
Photograph of Y-pipe filter assembly, retrieved Jan. 13, 2006 from the Internet at http://www.rainbird.com/images/products/drip/control/wyefilter_bg.jpg, illustrating a commercially available embodiment prior to Aug. 2, 2004, 1 page.
Rain Bird® Catalog, Landscape Irrigation Products, 2008-2009, p. 40.
Rain Bird® Initial Concepts, Nov. 8, 2017, 1 page.
Rain Bird® Owner's Manual for Flow Sensors by Data Industrial, Mar. 23, 2015, 11 pages.
Rain Bird® PT3002 Flow Sensor Transmitter, Installation and Programming Instructions, 2012, 48 pages.
Rain Bird® Scale: 2-1 (200%), GPM Flow Full Indexes, at least prior to Jul. 13, 2017, p. 1.
Rain Bird® Scale: 2-1 (200%), GPM Flow, at least prior to Jul. 13, 2017, p. 1.
Rain Bird® Tech Spec, Flow Sensors—BSP: Flow Sensing for Maxicom2®, SiteControl™, IQ™ v2.0, LXD, LXME, LXMEF, <www.rainbird.com>, 2015, 5 pages.
Rain Bird® Tech Spec, Flow Sensors—NPT: Flow Sensing for Maxicom2®, SiteControl™, IQv2.0, ESP-LXD, ESP-LXMEF, <www.rainbird.com>, 2015, 5 pages.
Rain Bird® Troubleshooting Guide, FS Series Flow Sensors, 2016, 2 pages.
Rotameter, <https://en.wikipedia.org/wiki/Rotameter>, Wikipedia, at least prior to Jul. 13, 2017, 3 pages.
USPTO, U.S. Appl. No. 15/792,273; Office Action mailed Mar. 15, 2019; (pp. 1-14).
USPTO; U.S. Appl. No. 15/649,332; Office Action mailed Apr. 1, 2019; (pp. 1-9).
USPTO; U.S. Appl. No. 15/649,332; Office Action mailed Aug. 20, 2019; (pp. 1-8).
USPTO; U.S. Appl. No. 16/858,159; Office Action mailed Oct. 14, 2020; (pp. 1-14).
USPTO; U.S. Appl. No. 16/729,083; Non-Final Rejection mailed Oct. 24, 2022; (pp. 1-9).
USPTO; U.S. Appl. No. 17/161,430; Final Rejection mailed Nov. 1, 2022; (pp. 1-14).
USPTO; U.S. Appl. No. 62/361,873, Application filed Jul. 13, 2016, entitled "Flow Sensor,".
USPTO; U.S. Appl. No. 62/786,822, Application filed Dec. 31, 2018, entitled "Flow Sensor Gauge,".

(56) References Cited

OTHER PUBLICATIONS

USTPO; U.S. Appl. No. 62/427,675, Application filed Nov. 29, 2016, entitled "Flow Sensor,".
USPTO; U.S. Appl. No. 18/166,170; Response to Non-Final Office Action filed Mar. 10, 2025.
USPTO; U.S. Appl. No. 18/166,170; Notice of Allowance and Fees Due (PTOL-85) mailed Jun. 23, 2025; (pp. 1-9).

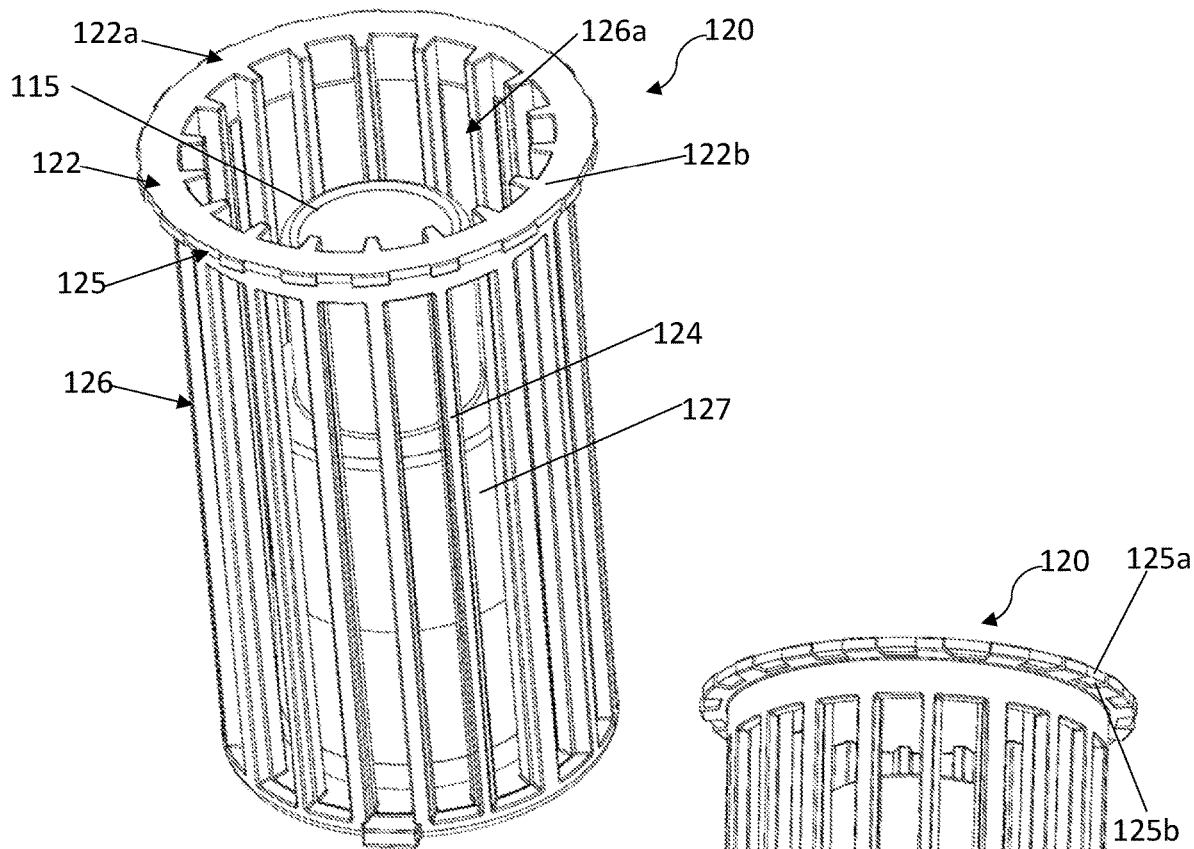
FIG. 7A
FIG. 7B
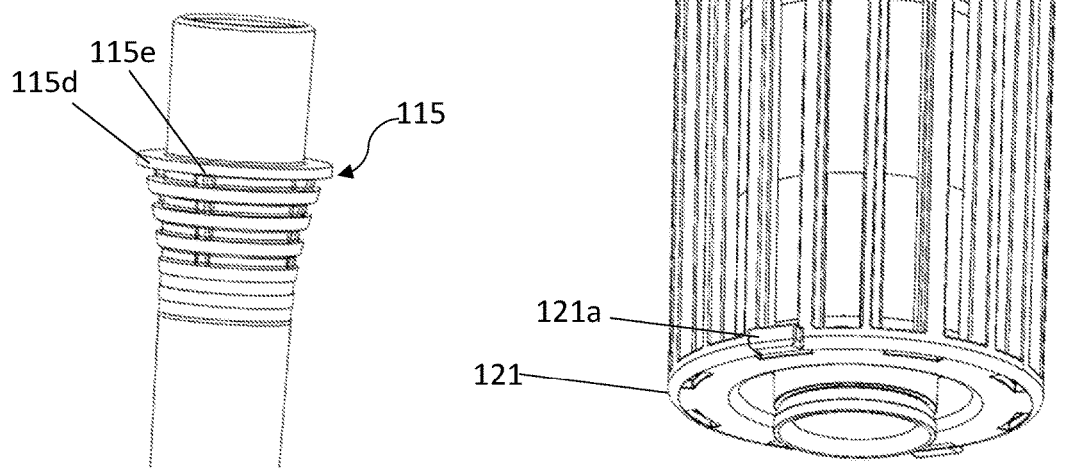
FIG. 8

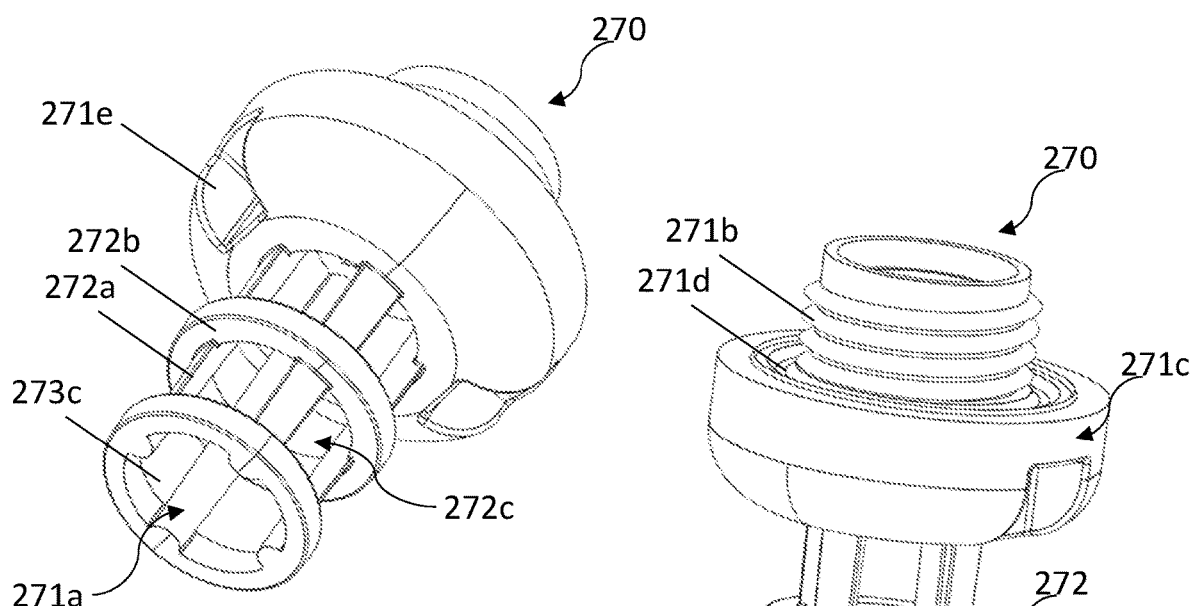
FIG. 26
FIG. 27
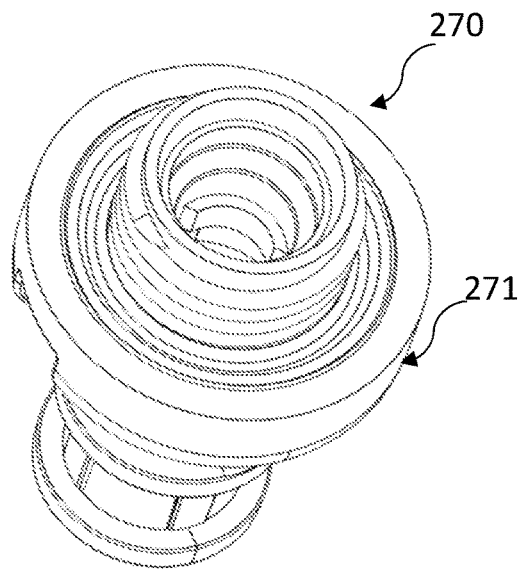
FIG. 28

ZONE CONTROL DEVICES, SYSTEMS AND METHODS

FIELD

The present invention relates to irrigation zone control devices, systems, and methods and, more particularly, to irrigation zone control devices, systems, and methods integrating multiple functions into a single unit.

BACKGROUND

Irrigation systems use several devices to deliver irrigation water to a terrain. Depending on the size of the terrain, an irrigation system, such as a sprinkler system, may be divided into one or more irrigation zones. When the terrain is large, multiple zones may be necessary due to water supply constraints that prohibit using only a single zone. For instance, in a typical sprinkler system, each zone includes a plurality of sprinklers controlled by a zone valve. Because each zone has its own valve, zoning allows more control over different areas of the terrain that may have different needs. This can increase the system's efficiency, minimize water waste, and improve plant health.

The valves for different zones are typically installed together along a manifold in a valve box that is embedded in the ground and connected to a common supply line. The box protects the valves and provides access for maintenance of the valves.

The valve box may also include other devices necessary for proper functioning of the sprinkler system. For instance, the valve box may include a pressure regulator for each zone. Water pressure in a supply line may at times exceed the pressure at which a zone is designed to operate and effectively irrigate. Regulating the pressure of the system ensures that the emitting devices, such as sprinklers, receive water from the line at a correct pressure (e.g., about 30 to 55 psi) so that the devices operate properly. It also protects the components of the zone against damage that could be caused by excessive water pressure or surges in pressure.

The valve box may also include a filtering device for each zone on the manifold. Sediment or debris in irrigation water can degrade the performance of water emitting devices. For instance, it can clog sprinklers, cause uneven spray patterns, and prevent pop-up sprinklers from extending and retracing completely. Sediment in the piping can also increase friction and decrease water pressure and flow. A filter removes the sediment and debris from the water to protect the irrigation system.

FIG. 1 illustrates a zone control assembly 2 that may be assembled within a valve box. The zone control assembly 2 commonly includes a valve 4, a filter 6, and a pressure regulator 8 connected to one another via piping in series. Fluid flow to the zone is controlled by the opening or closing of the valve 4, which may, for example, be a solenoid valve. When the valve 4 is open, fluid flows through the piping to the filter 6, and the filtered water subsequently flows through the piping to the pressure regulator 8 which regulates the pressure of the water prior to delivering the water to the sprinklers.

Valve boxes are limited in space. For instance, valve boxes are generally rectangular or round with dimensions ranging from about 7 inches to about 30 inches. Because space is limited in a valve box, the appropriate components for some irrigations systems may not neatly fit the valve box to permit easy maintenance. For instance, the arrangement illustrated in FIG. 1, with the valve 4, filter 6, and pressure regulator 8 being separate components spaced along the pipe, takes up a relatively large space in the box. In addition, the multiple points of connection between the devices can increase the likelihood of leaks and increase the cost of installation. Further, as water flows through the numerous components and passageways, this may result in inefficiencies, such as less optimal flow or pressure loss. Due to such inefficiencies a higher inlet pressure may be required to achieve a desired downstream pressure.

Accordingly, a zone control assembly for a valve box that is compact, provides efficient performance characteristics, and facilitates easy installation and maintenance is desirable.

BRIEF DESCRIPTION OF THE DRAWINGS

FIG. 7A is a top perspective view of a filter of the zone control device of FIG. 2.

FIG. 7B is a bottom perspective view of the filter of the zone control device of FIG. 2.

FIG. 8 is a perspective view of a flow tube of the zone control device of FIG. 2.

FIG. 26 is a bottom perspective view of a filter nut of the zone control device of FIG. 2.

FIG. 27 is a side perspective view of the filter nut of FIG. 26.

FIG. 28 is a top perspective view of the filter nut of FIG. 26.

DETAILED DESCRIPTION

Figure 2:
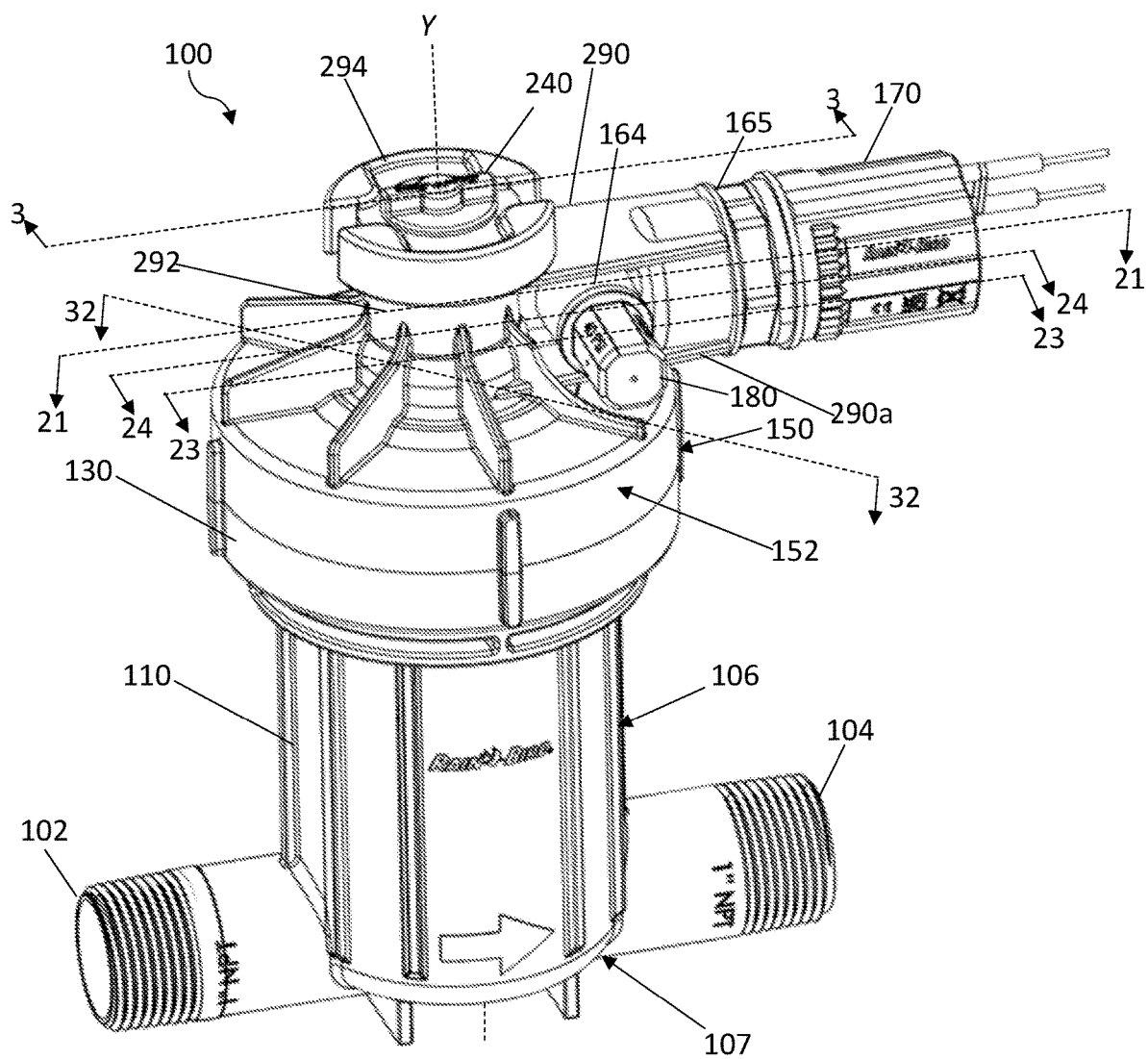
FIG. 2 is a perspective view of a zone control device.
Figure 3:
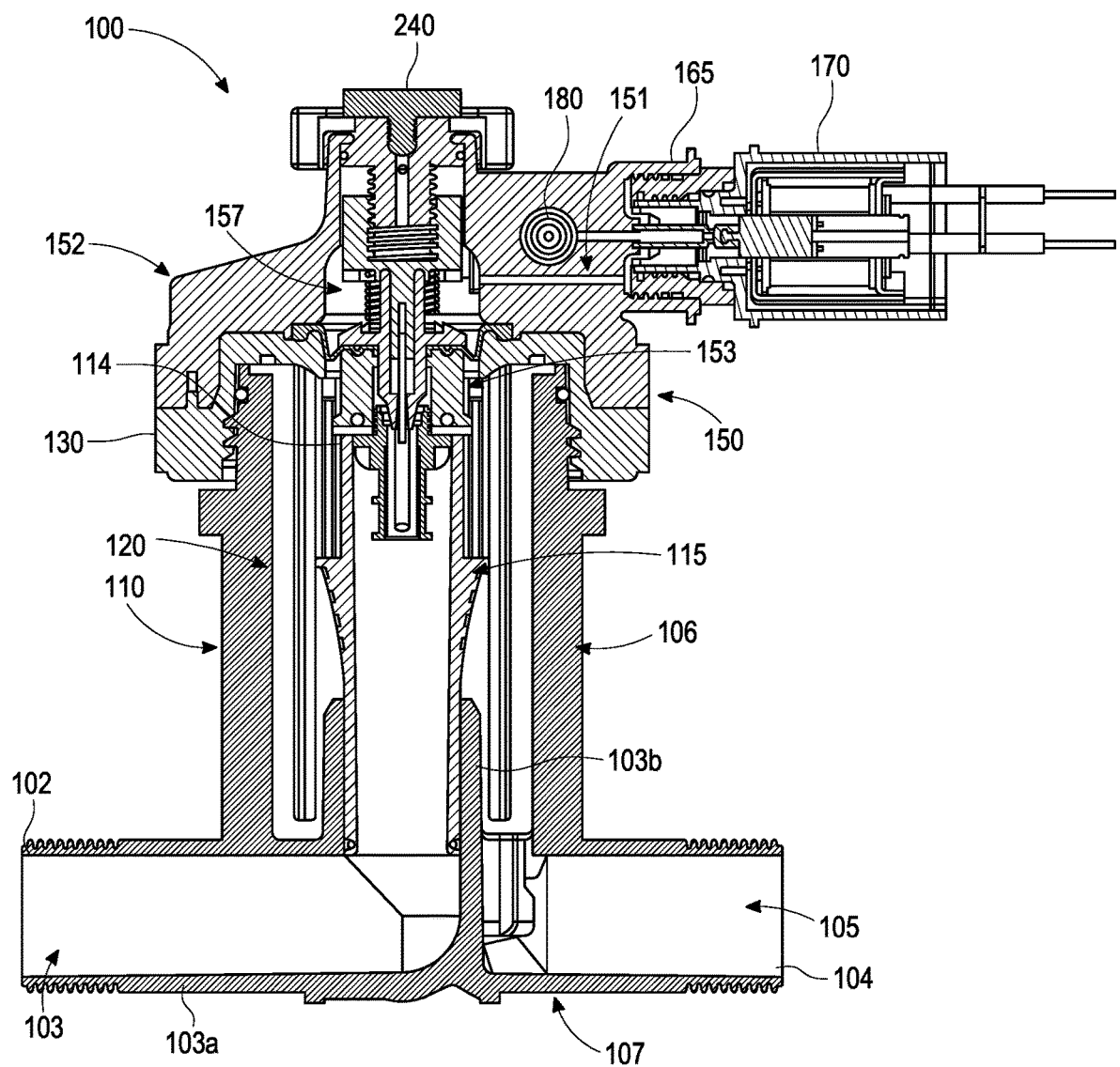
FIG. 3 is a cross-section view of the zone control device of FIG. 2 taken along line 3-3 of FIG. 2.
Figure 4:
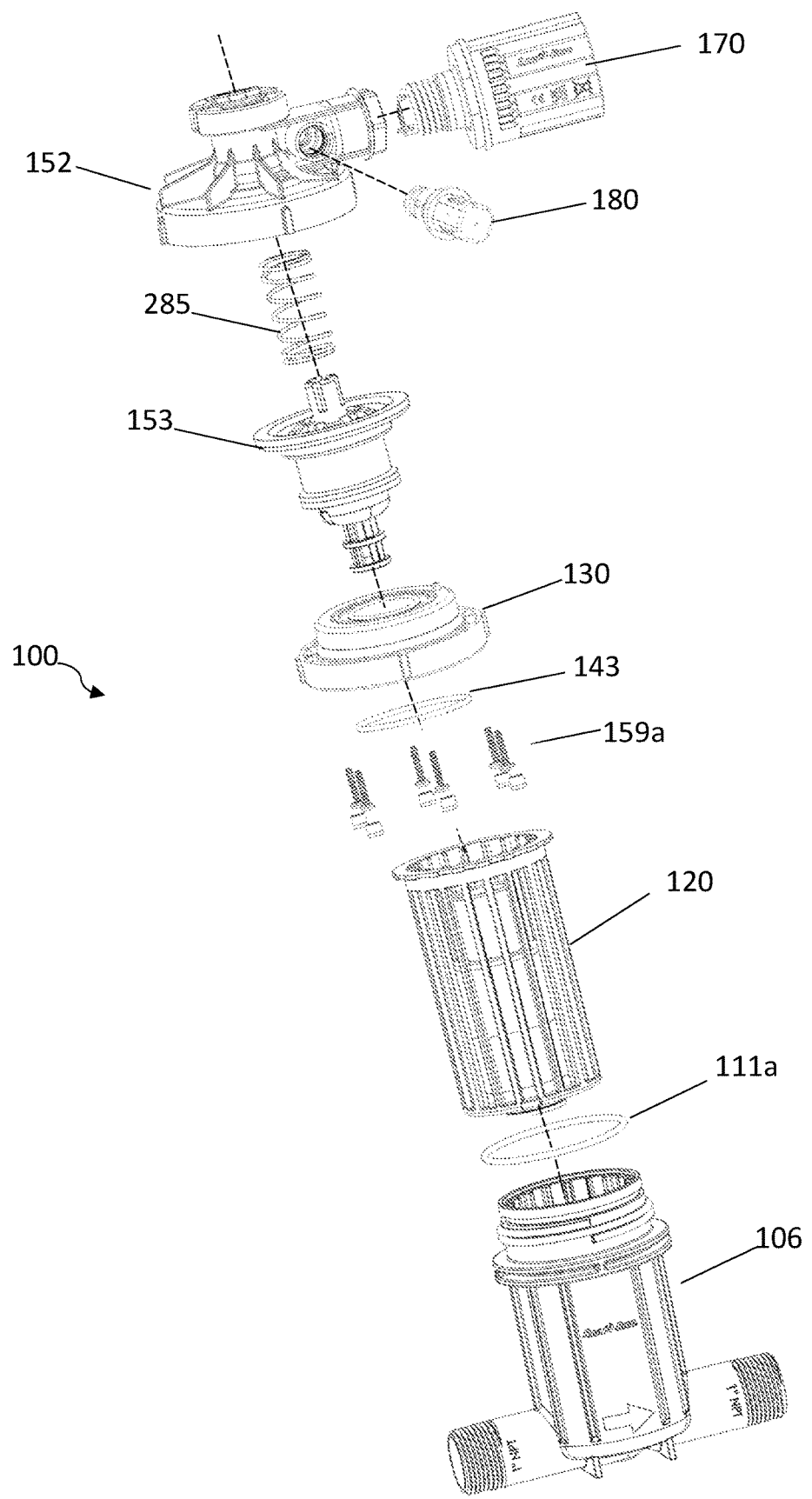
FIG. 4 is an exploded view of the zone control device of FIG. 2.
Figure 5:
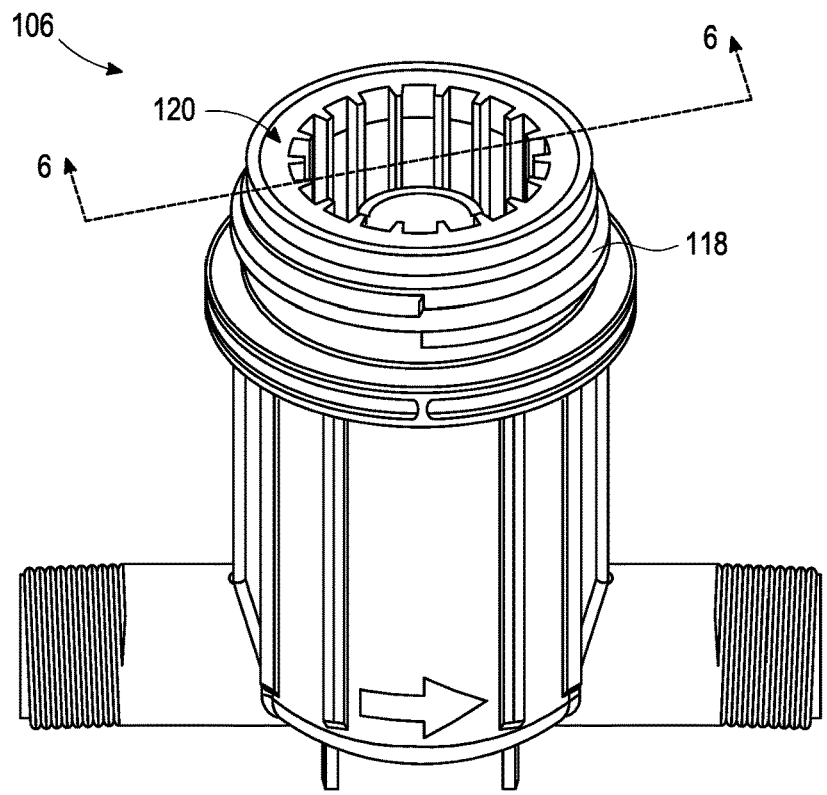
FIG. 5 is a top perspective view of a main body of the zone control device of FIG. 2 with a filter inserted therein.
Figure 6:
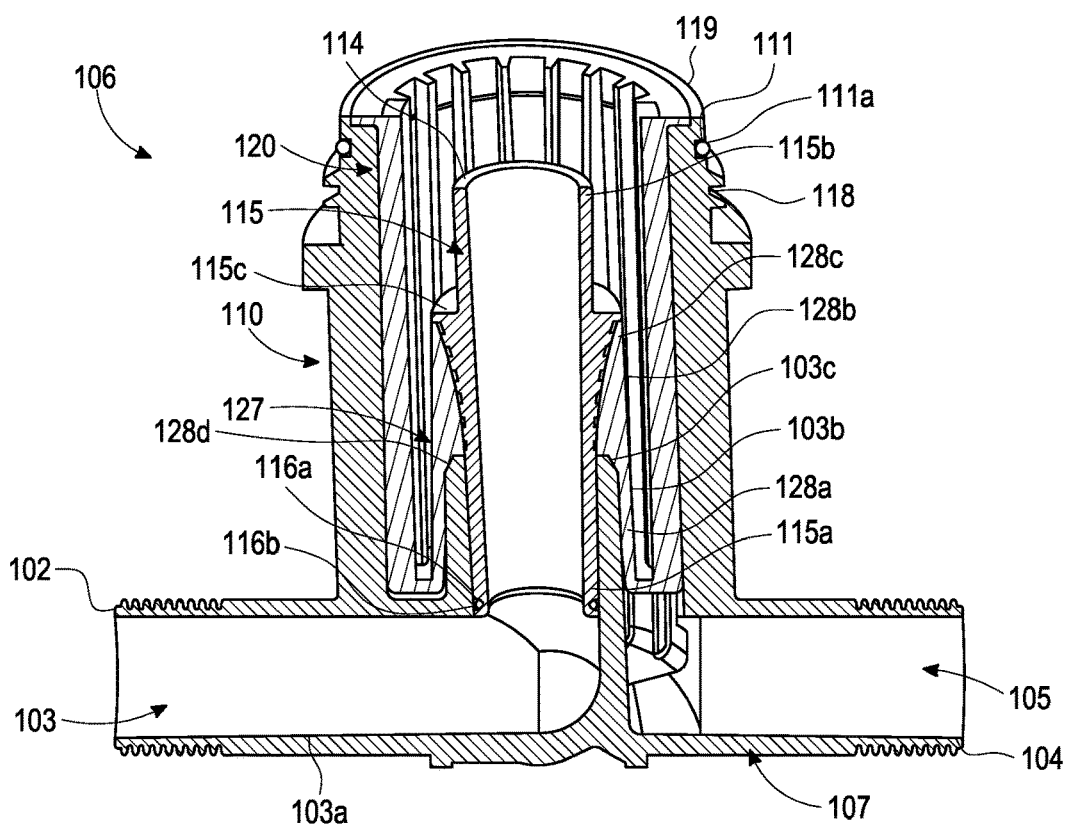
FIG. 6 is a cross-section view of the main body with the filter inserted therein of FIG. 5 taken along line 6-6 of FIG. 5.

With reference to FIGS. 2-4, there is illustrated a zone control device 100. The zone control device 100 includes a main body 106, an inlet 102, an outlet 104, a filter 120, a valve bonnet or valve housing 152, an adapter 130, a pressure regulator 180, and a valve 150. The zone control device 100 is an all-in-one device that facilitates space conservation and efficient installation. In addition, since the pressure regulator 180 is disposed in a vent flow path for controlling the valve 150, pressure regulation occurs through operation of the valve 150. Furthermore, the fluid vented through the pressure regulator 180 is advantageously vented downstream of the filter 120 so that build-up of debris within the filter 120 does not interfere with pressure regulation.

The zone control devices disclosed herein have features like those described in U.S. patent application Ser. No. 18/166,170, filed Feb. 8, 2023, which is incorporated by reference herein in its entirety.

As shown in FIGS. 3, 5, 6, and 10 the main body 106 has a base portion 107 and a body portion 110 that may be formed as a single piece. The inlet 102 and the outlet 104 are disposed at opposite sides of the base portion 107, while the body portion 110 extends generally perpendicularly away from the base 107. The body portion 110 has a generally cylindrical shape and defines an interior chamber or cavity 109. The body portion 110 functions, in part, as a filter housing for the filter 120 (e.g., a basket filter), which is received in the chamber 109.

At the base portion 107, the inlet 102 and the outlet 104 are configured for connection to conduits, such as those typically found in a valve box for an irrigation system. As illustrated, the inlet 102 includes external threads for cooperating with internal threads on an upstream conduit end or coupler, while the outlet 104 includes external threads for cooperating with internal threads on a downstream conduit end or coupler. Instead of threading, other attachment methods may be used, such as gluing, clamping, or welding. In addition, the inlet 102 and the outlet 104 may include internal threads instead of external threads.

Figure 38:
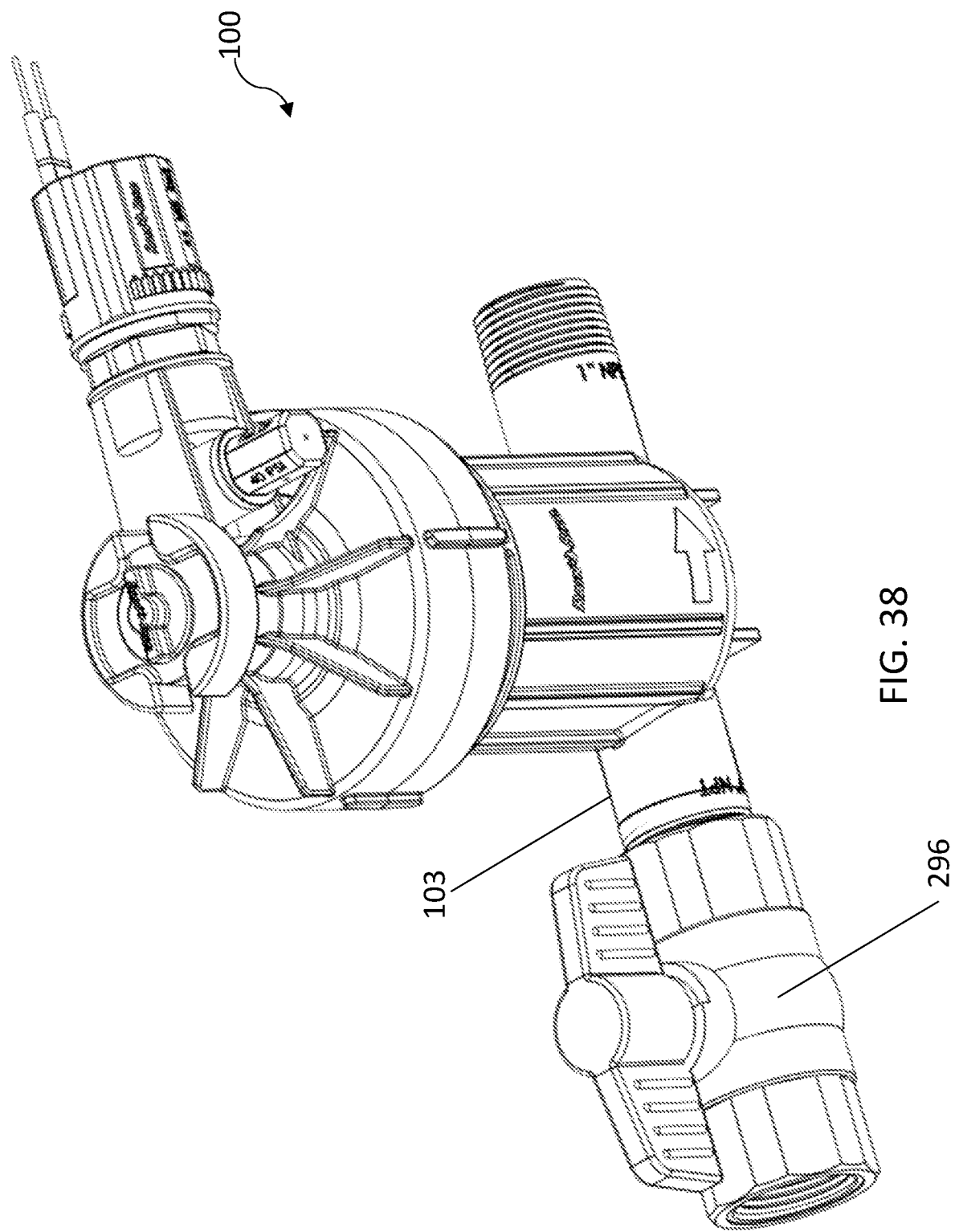
FIG. 38 is a perspective view of the zone control device of FIG. 2 coupled to a ball valve.

In embodiments, the inlet 102 may be directly or indirectly coupled to a ball valve 296 (FIG. 38). The ball valve 296 upstream of the inlet 102 permits a user to conveniently turn off the flow through the zone control device 100 so the filter 120 can be replaced in the zone control device or maintenance can be conducted on the valve 150.

The base portion 107 further defines an inlet passage 103 and an outlet passage 105. At the center of the base portion 107, the inlet passage 103 turns into the body portion 110 so that fluid passes from a lateral portion 103a of the inlet passage 103 to a longitudinal portion 103b of the inlet passage 103 that extends within the body portion 110 of the body 106. The longitudinal portion 103b is sized to receive or otherwise attached to a central flow tube or seat tube 115 that delivers water from the inlet passage 103 to the valve 150, as described further below.

The body portion 110 includes a plurality of longitudinal ribs 113 spaced about the chamber 109 and extending inwardly into the chamber 109, defining longitudinal channels 113a therebetween. The longitudinal ribs 113 may extend substantially an entire length of the body portion 110 and stiffen the body portion 110 so that it resists outward deformation when the valve is turned on. As described further below, when the filter 120 is received in the body portion 110, the longitudinal channels 113a define in part a fluid path in the space between the filter 120 and the main body 106 for downstream flow of fluid between the filter 120 and the outlet 104. In addition, as described further below, a vent system includes a vent passage 151 through the bonnet 152 and a vent passage 138 through the adapter 130 communicating with the longitudinal channels 113a so that fluid from the vent passages is vented downstream of the filter 120.

An annular top 110a of the body portion 110 includes an upstanding rim 119 and a recessed annular ledge 112 disposed radially inward from the rim 119. The recessed annular ledge 112 may form a continuous surface with top surfaces of the longitudinal ribs 113. In embodiments, a flange 122a of the filter 120 may rest on the longitudinal ribs 113 and the recessed annular ledge 112.

With reference to FIGS. 3, 6, and 7A-8, the body portion 110 is configured to house the filter 120. The filter 120 includes a filter body 126 with an annular base 121. The annular base 121 has tabs 121a that extend radially from the annular base 121, and each tab 121a fits between two of the longitudinal ribs 113. The longitudinal ribs 113 guide the filter 120 into the chamber 109 and hold the filter 120 against rotational movement. An inner annular wall 127 of the filter body 126 extends axially into an interior 126a of the filter 120 from an inner edge of the annular base 121. The inner annular wall 127 may have a first annular portion 128a having a slightly larger inner diameter than the outer diameter of the longitudinal portion 103b of the inlet passage 103 so that the inner annular wall 127 of the filter 120 slides onto the outside of the longitudinal portion 103b. The inner annular wall 127 may also have a second annular portion 128b that extends from the first annular portion 128a farther into the interior 126a of the filter 120. In some embodiments, the second annular portion 128b is coupled to and/or supports the flow tube 115. In one example, for instance, the second annular portion 128b includes a funneled or arcuate interior annular surface that engages a corresponding arcuate or flared surface or flange 115c of the flow tube 115. Specifically, the second annular portion 128b may have an inner diameter that gradually increases to accommodate the flared flange 115c of the flow tube 115.

In some embodiments, the flared flange is welded or glued to the second annular portion 128b. The flared flange 115c may be disposed between a first end 115a of the flow tube 115 and a second end 116b of the flow tube 115. An inner transitional surface 128d between the first annular portion 128a and the second annular portion 128b may engage or seat on a terminal end 103c of the longitudinal portion 103b when the filter 120 is inserted into the chamber 109 of the main body 106.

In the illustrated embodiment (see FIG. 8), the flared flange 115c is discontinuous and defined by a series of circumferential locating ribs 115d and vertical support ribs 115e to support the flow tube's weld plate during pressure loading when the valve is closed.

When the filter 120 is received in the chamber 109, a first end portion of the flow tube 115 including the first end 115a extends into the longitudinal portion 103b of the inlet passage 103 such that the longitudinal portion 103b slides between the first end 115a of the flow tube 115 and the first annular portion 128a of the inner annular wall 127. A second portion of the flow tube 115 including the second end 115b extends axially towards the valve 150 to engage a diaphragm assembly 153 of the valve 150. Specifically, the second end 115b of the flow tube 115 defines a valve seat 114 for the valve 150 that is engaged by a diaphragm assembly 153 to open and close the valve 150, described further below.

In some embodiments, an annular groove 116a is defined at the first end 115a of the flow tube 115 for receiving an o-ring 116b that seals between the inner surface of the longitudinal portion 103b of the inlet passage 103 and groove 116a of the flow tube 115.

While in the illustrated embodiment the flow tube 115 is welded to the inner annular wall 127 of the filter 120, the flow tube 115 may be coupled to the inner annular wall 127 in a different manner (e.g., friction fit, snap fit, etc.). In some embodiments, the flow tube 115 may be formed integrally with the inner annular wall 127. In some configurations, the flow tube 115 is a separate and removable piece that is inserted through the inner annular wall 127 and the longitudinal portion 103b of the inlet passage 103 during installation. In other configurations, the flow tube 115 may be permanently fixed to the longitudinal portion 103b through a weld or glue. The flow tube 115 also may be formed integrally with the longitudinal portion 103b.

The filter 120 has ribs 124 extending longitudinally from the annular base 121 to the annular top or rim 122 at the other end of the filter 120. The ribs 124 may be equally spaced from one another to enclose the interior 126a of the filter 120 and may project radially inwardly into the interior 126a. The filter 120 includes a screen (not shown) at the ribs 124 (e.g., embedded into the ribs 124) to filter debris from the water flowing through the filter 120.

As noted above, the annular top 122 of the filter 120 may include the flange 122a. The flange 122a allows the filter 120 to seat on the recessed annular ledge 112 of the main body 106. The flange 122a includes cut-outs or notches 125 equally spaced about the perimeter of the flange 122a. A first portion 125a of each cut-out 125 defines a recess in the side edge of the flange 122a while a second portion 125b of each cut-out 125 defines a recess in the underside of the flange 122a. Together, the first portion 125a and the second portion 125b of each cut-out 125 form an L-shaped cut-out. As described further below, the cut-outs 125 define a pathway for fluid from the vent flow path of the valve 150 to be vented downstream of the filter 120.

With reference to FIGS. 3, 6, and 9-11, a bonnet 152 is stacked on the body portion 110 of the main body 106 along a central longitudinal axis Y of the zone control device 100. In embodiments, the bonnet 152 is removably attached to the body portion 110 via an adapter or coupling 130. The bonnet 152 and the adapter 130 combine to hold a diaphragm assembly 153 in place and, thus, together, define a valve assembly 150a.

Advantageously, the valve assembly 150a including the bonnet 152 and the adapter 130 is removable from the zone control device 100 to clean or replace the filter 120 or replace or conduct maintenance on the valve 150. Removing the bonnet 152 and the adapter 130 as a single unit from the zone control device 100 is helpful because it allows the diaphragm assembly 153 to remain secured within the valve assembly 150a so as to not disturb the diaphragm assembly 153 when only replacing the filter 120.

Specifically, the body portion 110 may include external threading 118 that cooperates with internal threading 136 of the adapter 130 so that the valve assembly 150a can be easily coupled to or decoupled from the body portion 110. The body portion 110 further includes an annular recess 111 on an external surface thereof for receiving an o-ring 111a to seal the interface between the body portion 110 and the adapter 130.

The adapter 130 is uniquely designed to provide an interface between the main body 106 of the zone control device 100 and the other components of the valve 150 or bonnet 152. For example, the adapter 130 is disposed between the bonnet 152 and the main body 106 and is configured to engage with the bonnet 152, the diaphragm assembly 153, a vent passage 151 of the bonnet 152, and the main body 106, to allow the valve 150 to control flow of water from an inflow side 195 of the zone control device 100 upstream of the valve seat 114 to an outflow side 196 of the zone control device 100 downstream of the valve seat 114.

With reference to FIGS. 2-3, 9-12, and 25, components of the valve 150 include, among others, the bonnet 152, the diaphragm assembly 153, a flow control assembly 295, and a manual bleed screw or cap 240. The bonnet 152 and the diaphragm assembly 153 define a pressure chamber 157. The diaphragm assembly 153, described further below, includes a spacer 281, an annular diaphragm element 153b attached to the spacer 281, a diaphragm seal 153a carried on the spacer 281 for engaging the valve seat 114, a filter nut 270, and a filter 274. The diaphragm assembly 153 defines a central passage 153d where the filter 274 attaches for fluid to pass through the diaphragm assembly 153 to the pressure chamber 157 from the inflow side 195 of the device 100. In some embodiments, a spring 285 may be in the pressure chamber 157 between the flow control piston 295 and the diaphragm assembly 153. The spring 285 provides additional pressure on the diaphragm assembly 153 to close the valve 150 and to be overcome when the fluid pressure on the inflow side 195 opens the valve 150.

The bonnet 152 includes a solenoid socket or bowl 165 to attach a solenoid 170 to the valve 150. The solenoid 170 controls the opening and closing of the valve 150. The bonnet 152 also includes a pressure regulator socket 164 to attach a pressure regulator 180. The sockets 164, 165 may be adjacent to one another, with the pressure regulator socket 164 downstream of the solenoid socket 165 in the vent flow path of the valve 150. In some embodiments, the solenoid bowl 165 extends radially from the bonnet 152 and the pressure regulator socket 164 extends laterally from the bonnet 152. Other configurations of the sockets are possible. By one approach, and as illustrated, a planar support rib 290 extends from an upper portion of the solenoid socket 165 to a flow control housing portion 292 of the bonnet 152 below the flow control handle 294. The support rib 290 strengthens the connection between the solenoid socket 165 and the bonnet 152 to prevent damage when the valve is handled by grabbing the solenoid 170 or solenoid socket 165 during installation, removal and service. A second planar support rib may be positioned under the pressure regulator socket 164 substantially parallel to the support rib 290.

Figure 20:
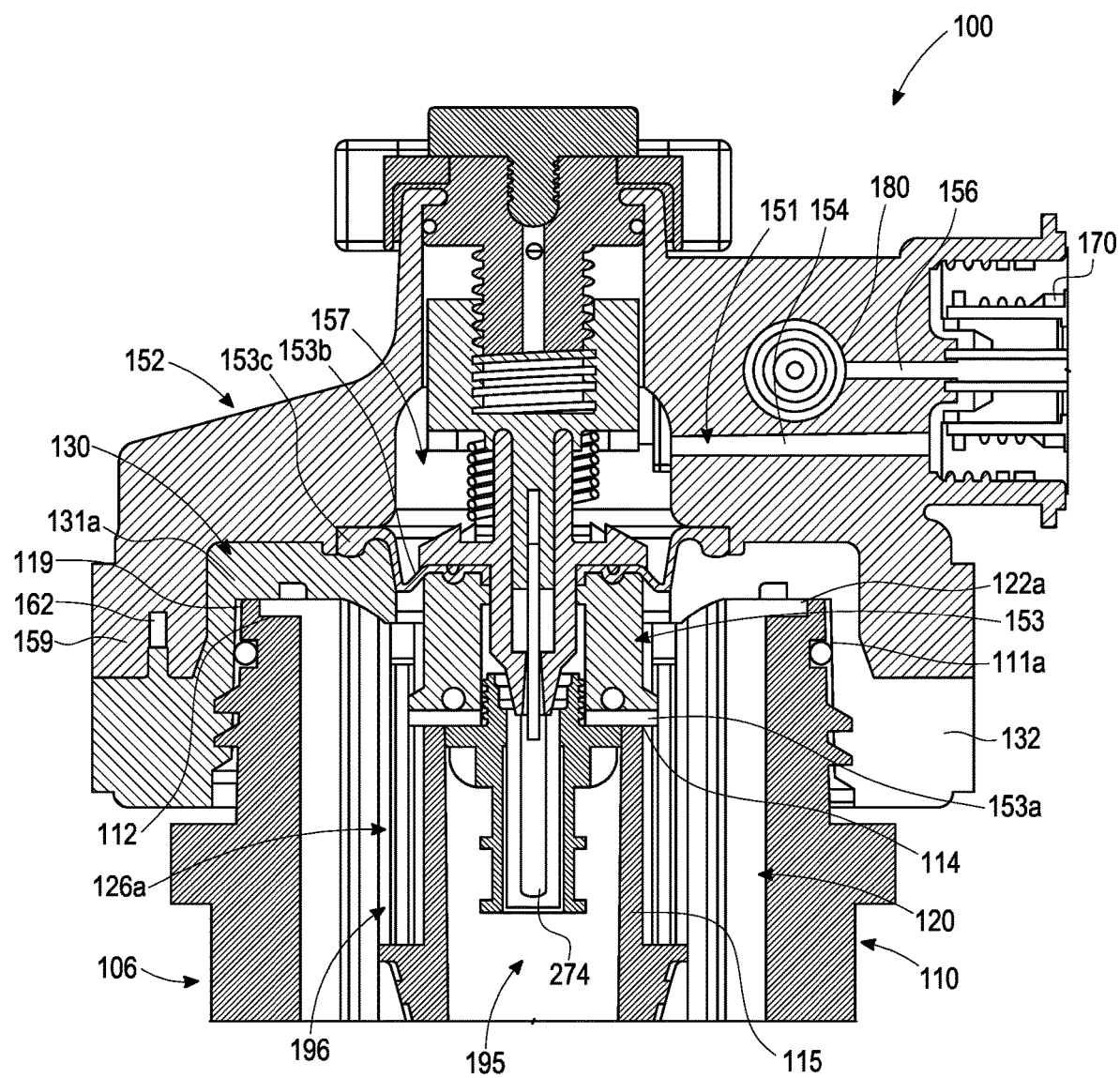
FIG. 20 is an enlarged cross-section view of a portion of the zone control device of FIG. 2 taken along line 3-3 of FIG. 2.

The solenoid 170 controls venting of the pressure chamber 157, thereby controlling opening and closing of the valve 150. A vent passage 151 in the bonnet 152 includes a pressure chamber vent passage 154 extending from the pressure chamber 157 to the solenoid bowl 165 (FIG. 20), and a solenoid vent passage 156 extending from the solenoid bowl 165 to the pressure regulator socket 164 (FIG. 20). The vent passage 151 also includes a pressure regulator vent passage 166 extending from an outlet opening 164d of the pressure regulator socket 164 towards a recess 166a (FIGS. 23-24) at the underside of the bonnet 152 for communication with a vent passage 138 of the adapter 130, described further below.

As shown in FIGS. 3, 9, 12, and 13, the bonnet 152 includes a cylindrical coupling portion 159 for fastening the bonnet 152 to the adapter 130. In embodiments, the cylindrical coupling portion 159 includes an outer annular wall 161a and an inner annular wall 161b spaced radially inward from the outer annular wall 161a. The inner annular wall 161b defines a cavity 160 of the bonnet 152 sized to receive a portion of the adapter 130. The diaphragm assembly 153 is centrally disposed within the cavity 160. In some embodiments, at least a portion of the diaphragm assembly 153 (e.g., the diaphragm seal 153a and the filter nut 270) extends out of the cavity 160 and past the coupling portion 159 of the bonnet 152.

In some approaches, the coupling portion 159 includes bosses 161c having holes or for fasteners 159a (FIG. 4). The bosses 161c may be spaced about a perimeter region of the coupling portion 159 in the space between the outer annular wall 161a and the inner annular wall 161b. For instance, in embodiments, there may be six bosses 161c equally spaced about the perimeter for receiving screws, bolts, or other fasteners. There may be other suitable numbers of bosses and fasteners (e.g., two, three, four, five, or more than six). The bosses 161c are dimensioned and positioned to align with corresponding bosses 132c in the adapter 130 that include corresponding holes or passages. This allows fasteners 159a to be inserted into both holes of the bosses 161c on the bonnet 152 and the passages in the bosses 132c on the adapter 130 to secure the bonnet 152 to the adapter 130. This configuration permits a user to remove the bonnet 152 from the adapter 130 if needed for maintenance or replacement. It also allows for cleaning of the diaphragm assembly or changing out the bonnet 152 or the diaphragm assembly 153 for different types of valves or diaphragms depending on desired performance. In alternative approaches, instead of fasteners, the bonnet 152 may be welded to the adapter 130, or the bonnet 152 and the adapter 130 may be formed integrally as a single component. In other approaches, other types of coupling are possible, such as threading.

Figure 10:
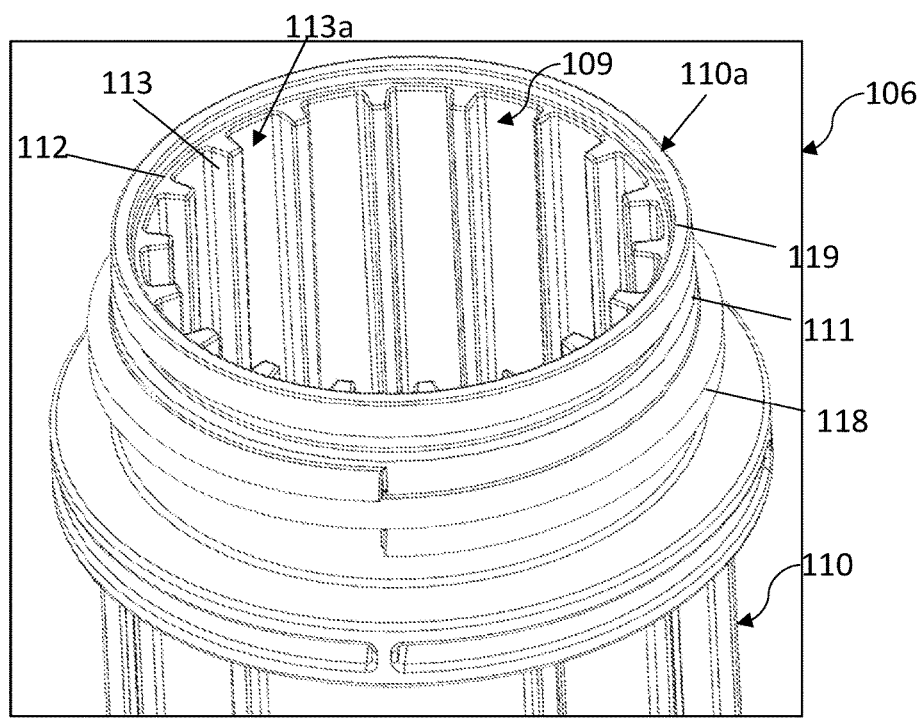
FIG. 10 is an enlarged top perspective view of a portion of the main body of the zone control device of FIG. 2.
Figure 11:
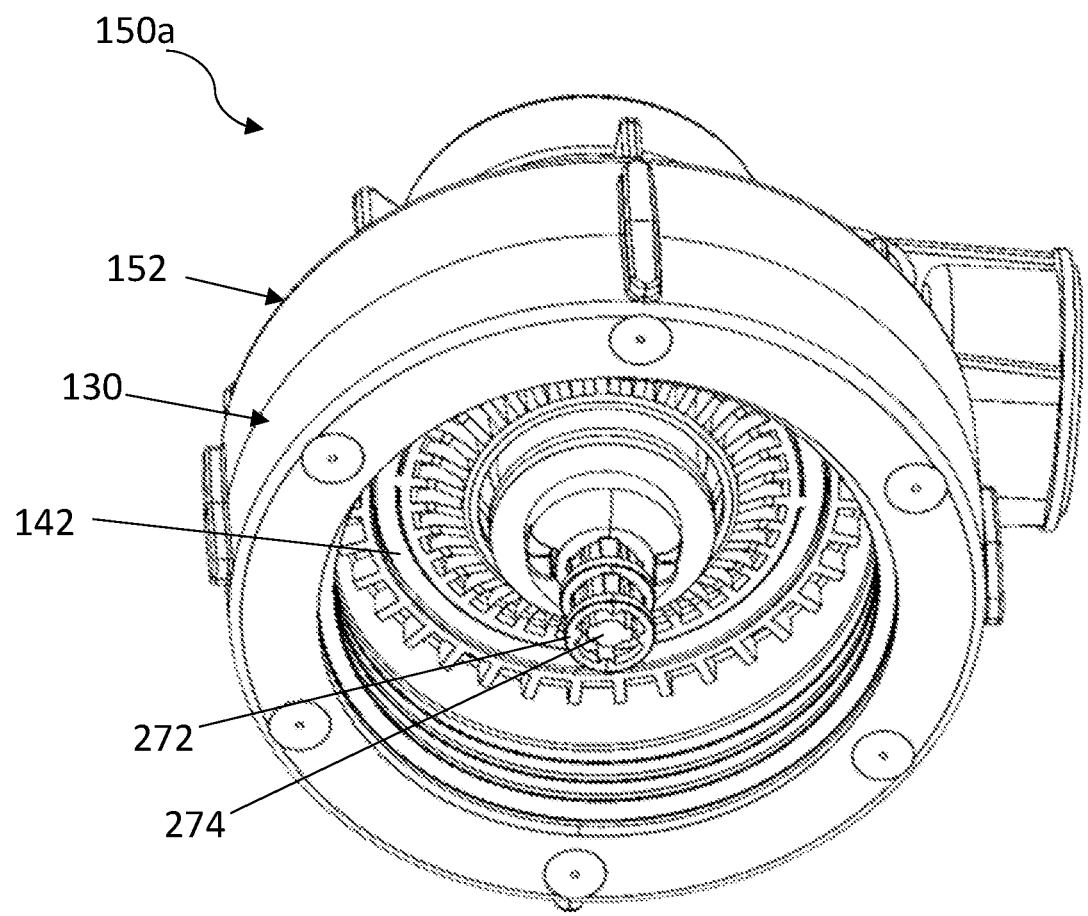
FIG. 11 is a bottom perspective view of the bonnet of the zone control device of FIG. 2 attached to the adapter of the zone control device of FIG. 2.
Figure 12:
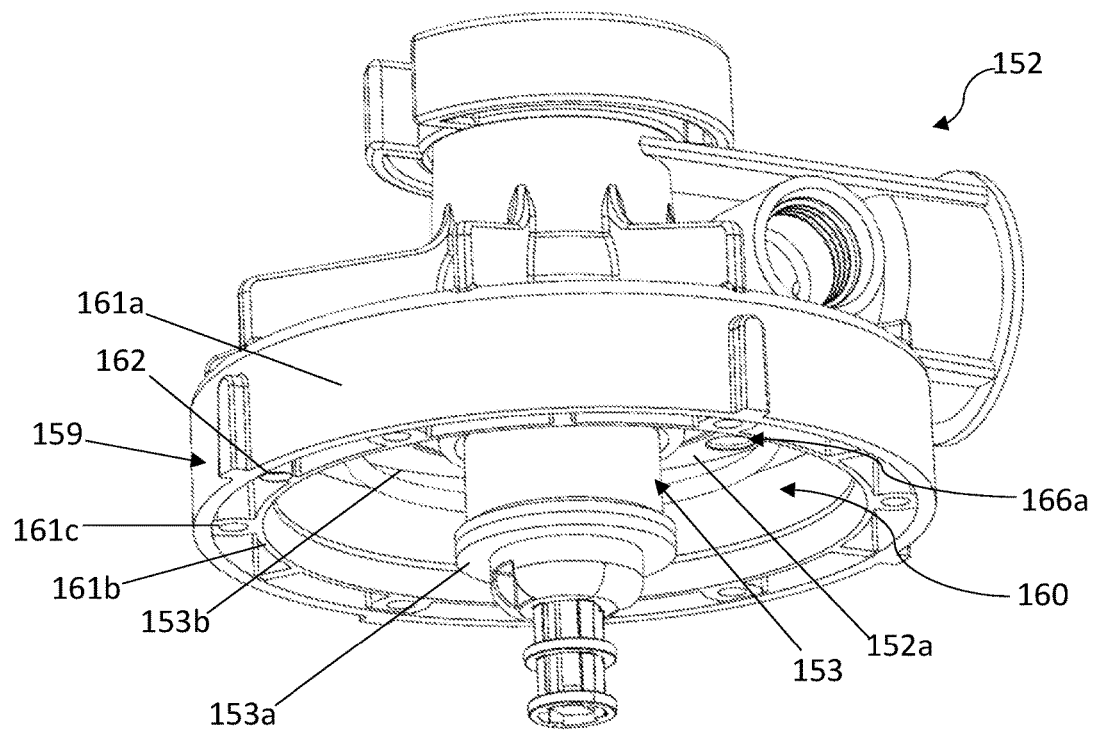
FIG. 12 is a bottom perspective view of the bonnet of the zone control device of FIG. 2.
Figure 13:
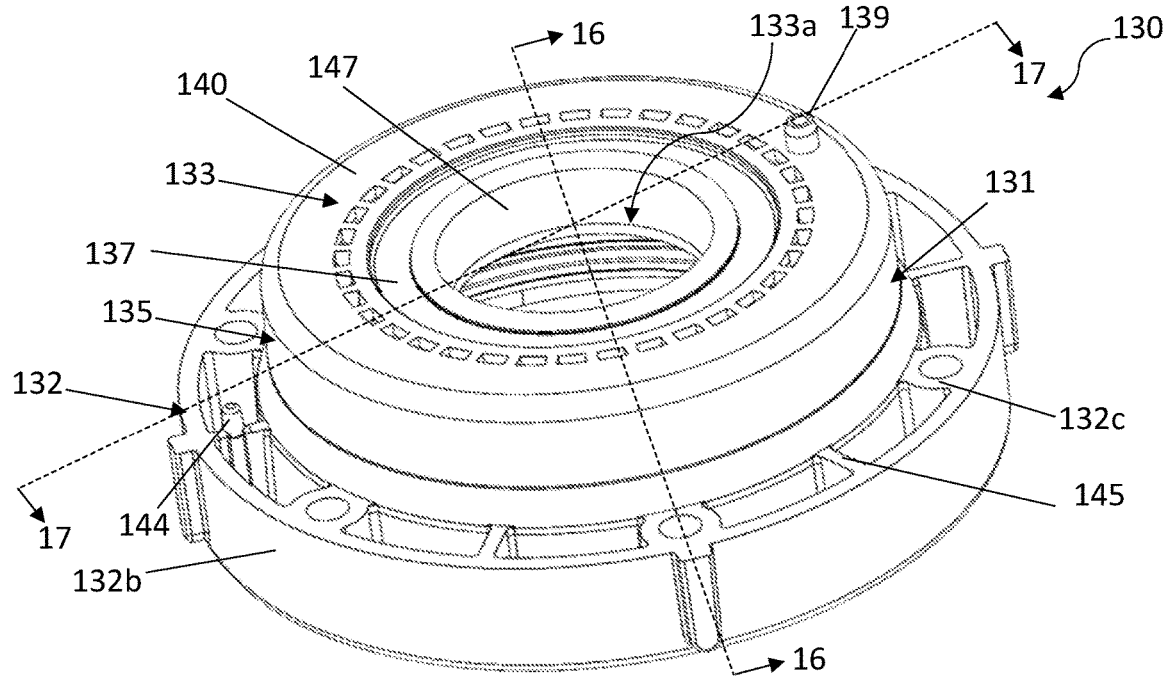
FIG. 13 is a top perspective view of the adapter of the zone control device of FIG. 2.
Figure 14:
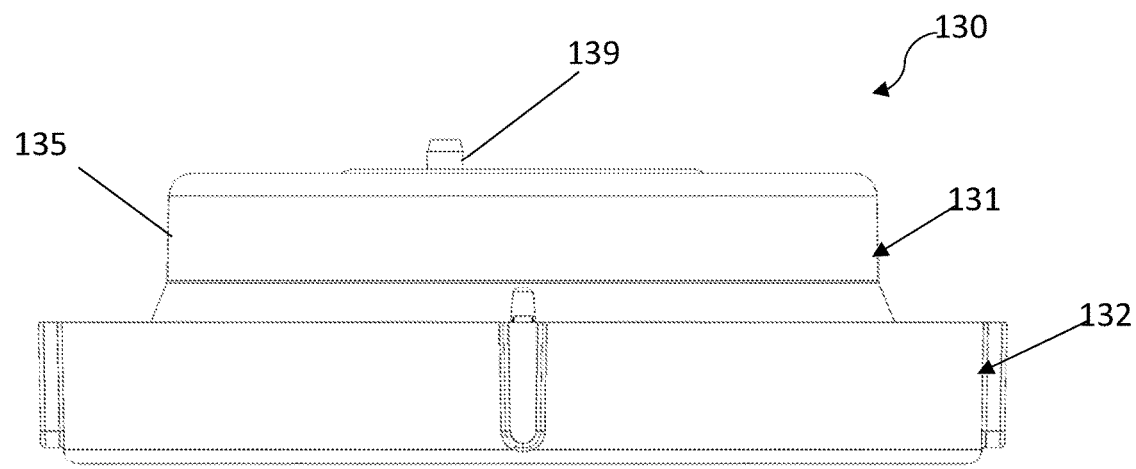
FIG. 14 is an elevation view of the adapter of FIG. 13.
Figure 15:
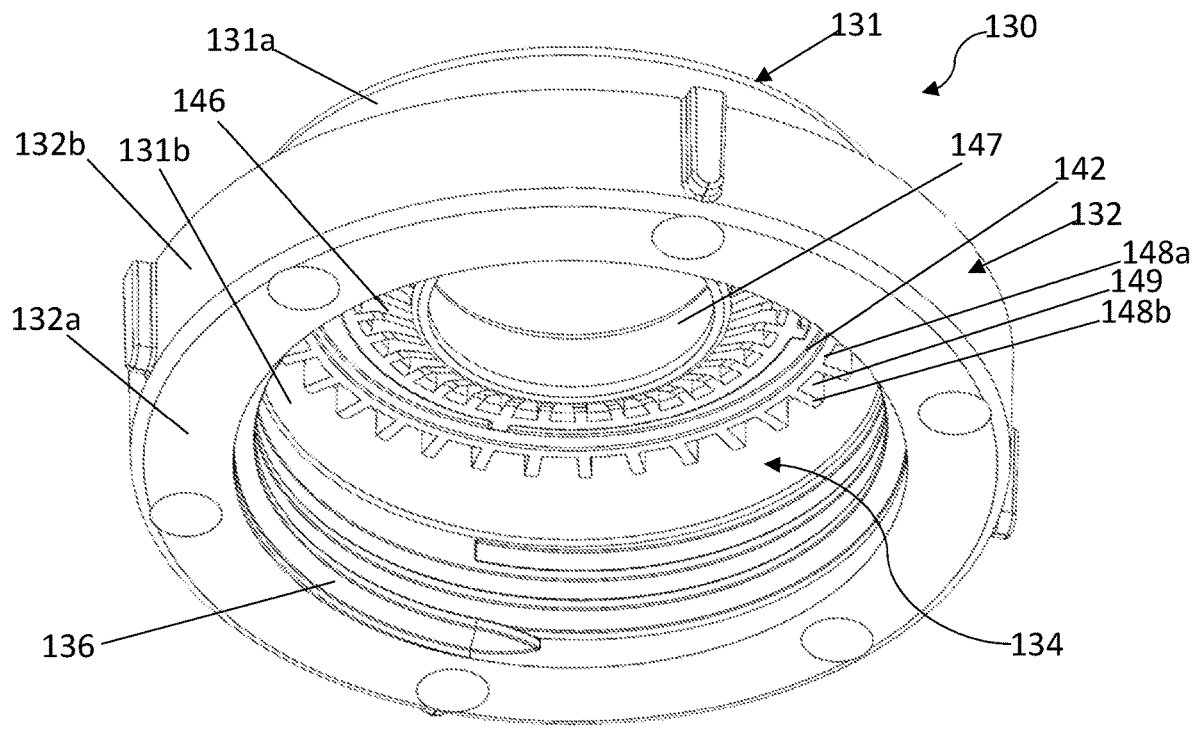
FIG. 15 is a bottom perspective view of the adapter of FIG. 13
Figure 16:
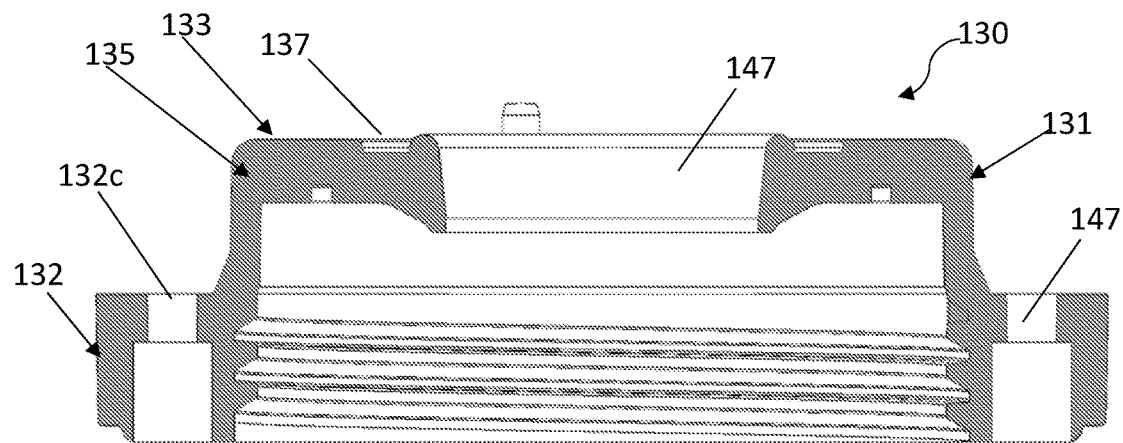
FIG. 16 is a cross-section view of the adapter of FIG. 13 taken along line 16-16 of FIG. 13.
Figure 17:
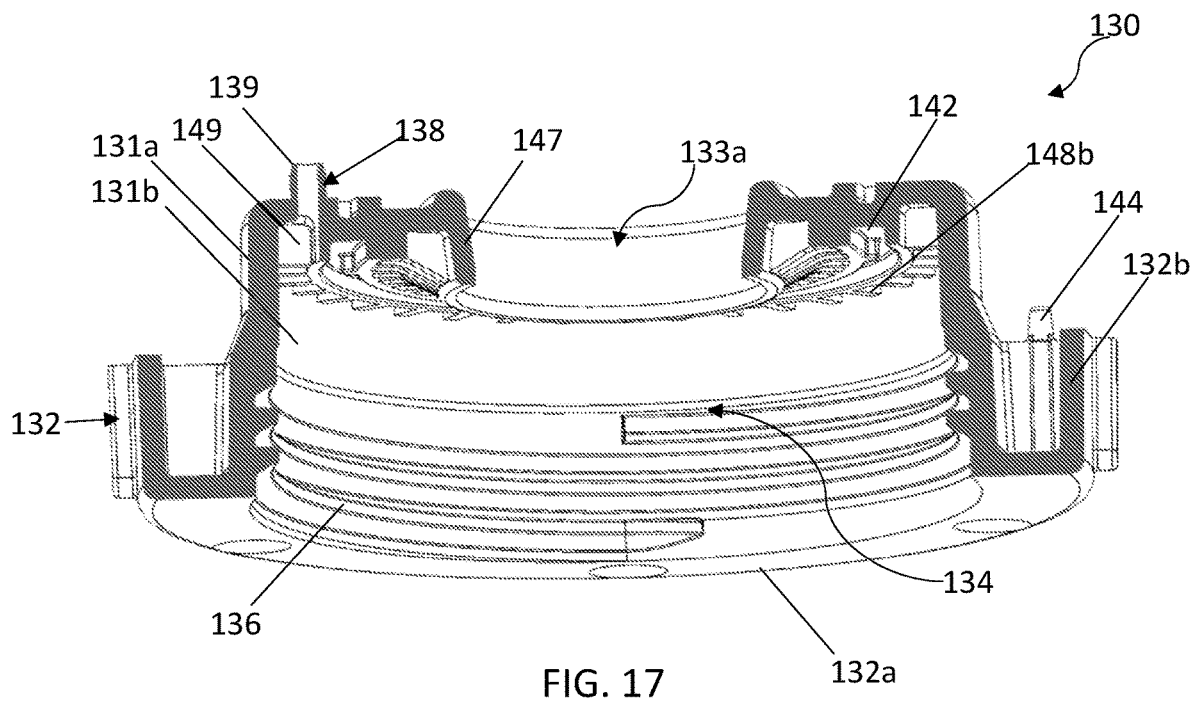
FIG. 17 is a cross-section view of the adapter of FIG. 13 taken along line 17-17 of FIG. 13.
Figure 18:
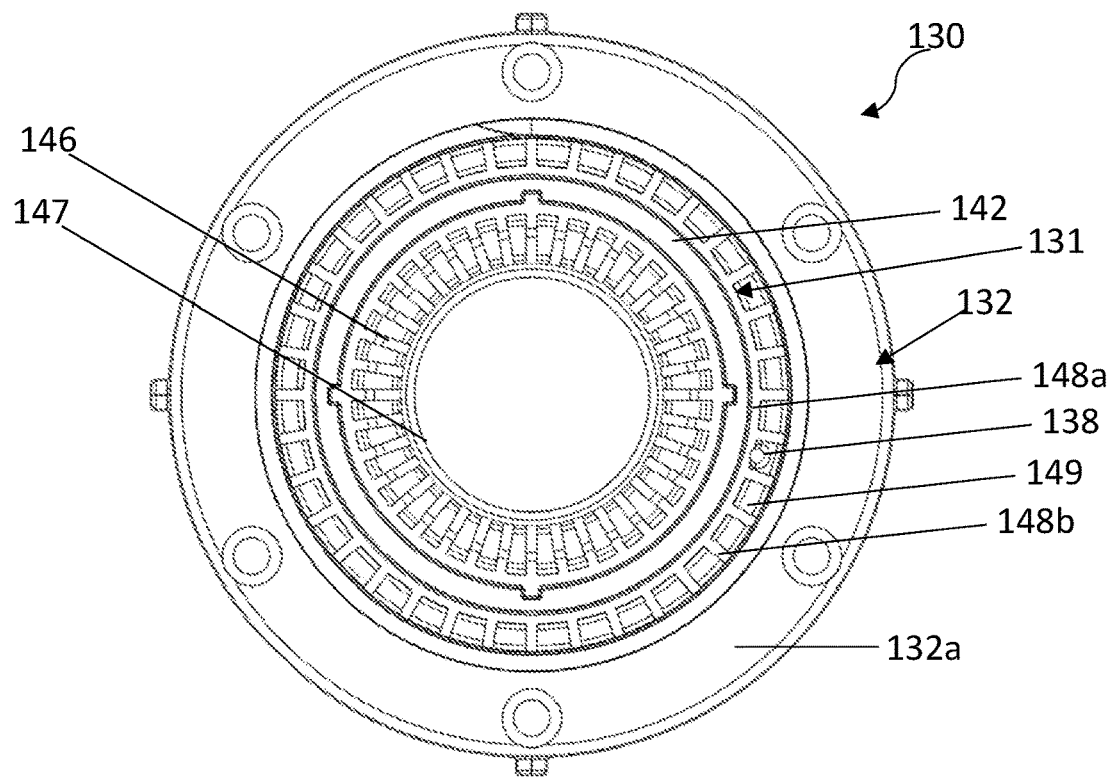
FIG. 18 is a bottom plan view of the adapter of FIG. 13.
Figure 19:
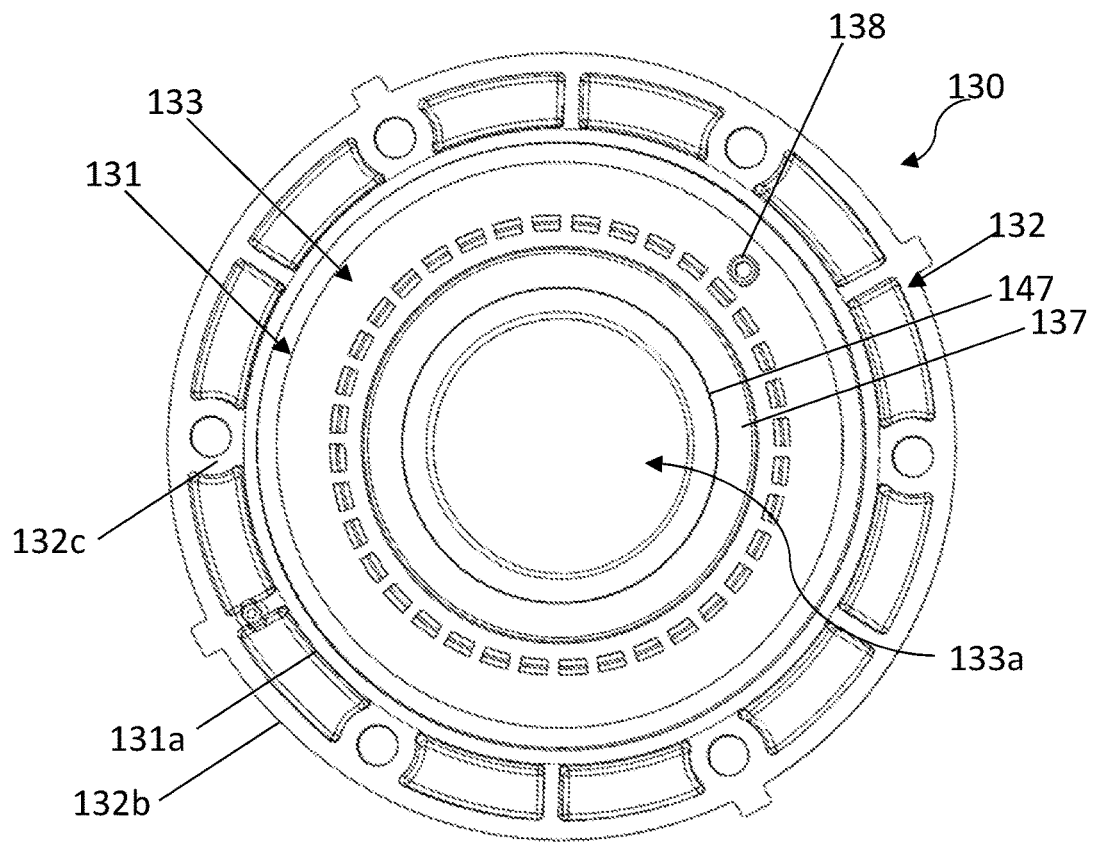
FIG. 19 is a top plan view of the adapter of FIG. 13.

With reference to FIGS. 12-20, the adapter 130 includes a generally cylindrical main body 131. An annular wall 131a of the body 131 defines a central cavity 134 of the adapter 130. An annular top portion 133 of the body 131 partially covers the cavity 134 and defines a central hole 133a through which a portion of the diaphragm assembly 153 can extend from the bonnet 152 into the cavity 134 of the adapter 130. The cavity 134 is sized to receive the body portion 110 of the main body 106 of the zone control device 100. Specifically, an inner surface 131b of the annular wall 131a includes threading 136 that cooperates with external threading 118 on the main body 106 to secure the adapter 130 to the main body 106, as noted above. When coupled to the main body 106, the top portion 133 of the adapter 130 may rest on an annular face 122b at the top 122 of the filter 120 defined by the flange 122a and tops of the ribs 124 (FIG. 7A). In some embodiments, the top portion 133 may also engage the upstanding rim 119 of the main body 106 (FIG. 10).

An annular flange portion 132 extends radially outward from the annular wall 131a from an end of the body 131 opposite the top portion 133. The annular flange portion 132 includes an annular bottom wall 132a extending radially outward from the annular wall 131a and an annular side wall 132b extending axially from the annular bottom wall 132a, spaced from and substantially parallel to the annular wall 131a. The annular flange portion 132 is sized and positioned to align with the coupling portion 159 of the bonnet 152. A plurality of bosses 132c having holes or passages, mentioned above, are disposed in the space between the annular wall 131a and the annular side wall 132b for aligning with the corresponding bosses 161c on the bonnet 152 so that the bonnet 152 and the adapter 130 can be coupled together. In some approaches, the passages in the bosses 132c are countersunk holes for receiving screws or other fasteners.

In embodiments, a plurality of connecting spokes 145 also connect the annular wall 131a to the annular side wall 132b. For example, the spokes 145 may be equally spaced about the annular wall 131a. In one configuration, at least one of the spokes 145 carries an alignment pin or tab 144 projecting axially from the spoke 145. The bonnet 152 includes a corresponding socket 162 (FIG. 12) for the pin 144 in the coupling portion 159. The pin 144 and the socket 162 ensure that the bonnet 152 and the adapter 130 are properly aligned and registered for functioning of the valve 150. In other configurations, the pin 144 and the socket 162 may be positioned elsewhere on the adapter 130 and the bonnet 152.

Figure 9:
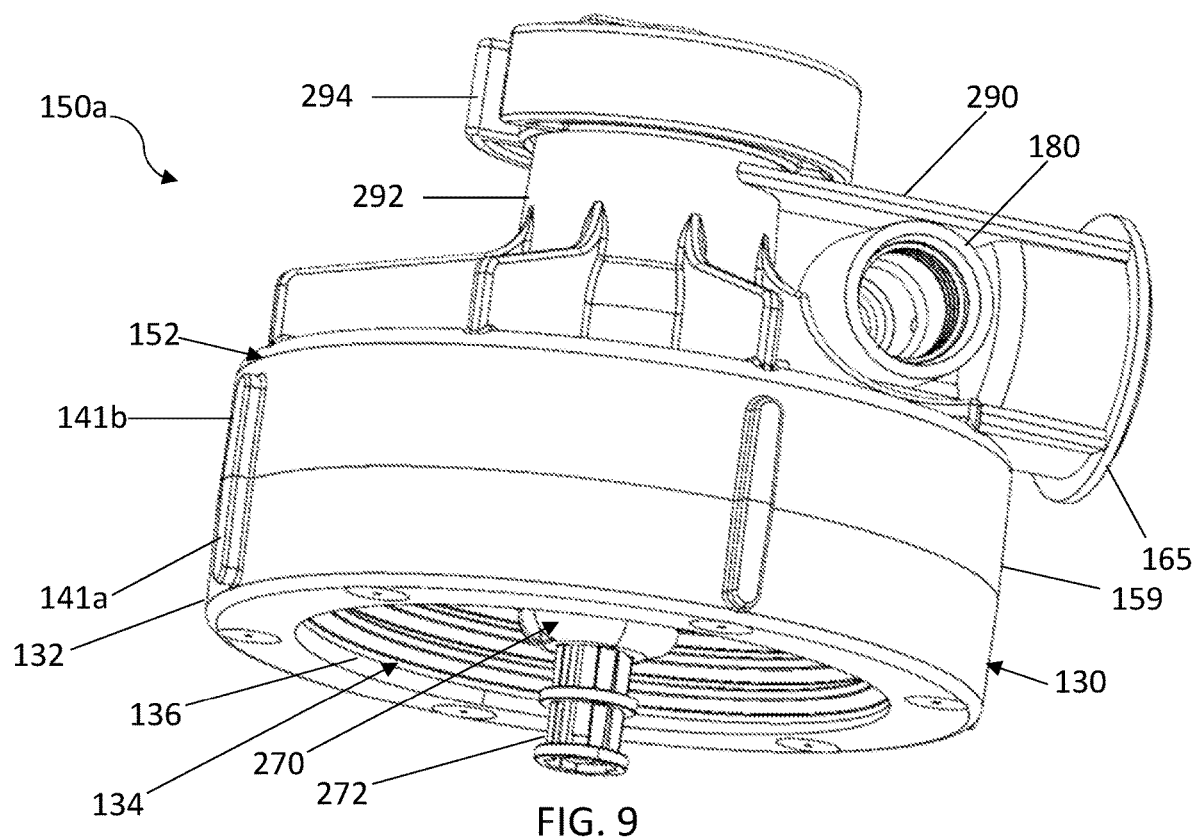
FIG. 9 is a bottom perspective view of a bonnet of the zone control device of FIG. 2 attached to an adapter of the zone control device of FIG. 2.

In some embodiments, when the bonnet 152 and the adapter 130 are properly positioned and coupled together, a plurality of corresponding ribs 141a and 141b on exterior surfaces of the coupling portion 159 of the bonnet 152 and the annular side wall 132b of the adapter 130 are aligned (FIG. 9). For instance, on each component there may be four or more longitudinal ribs spaced about the exterior surfaces. The ribs 141a, 141b are useful for gripping and turning the valve assembly 150a to attach or detach the valve assembly 150a to the main body 106.

When the bonnet 152 and the adapter 130 are coupled together at the coupling portion 159 and the flange portion 132, a protruding portion 135 of the main body 131 of the adapter 130 extends into the cavity 160 of the bonnet 152, with a portion of the diaphragm assembly 153 extending through the central hole 133a at the top portion 133 of the adapter 130 and into the cavity 134 of the adapter 130. The outer diameter of the protruding portion 135 is slightly less than the inner diameter of the cavity 160 of the bonnet 152 for a close fit.

The top portion 133 of the adapter 130 engages an inner annular shoulder 152a within the cavity 160 of the bonnet 152. The annular diaphragm element 153b is sandwiched between the inner annular shoulder 152a and the top portion 133 of the adapter 130. Specifically, a bead 153c of the annular diaphragm element 153b is held between an annular recess 137 at the top portion 133 of the adapter 130 and corresponding geometry of the inner annular shoulder 152a.

The central hole 133a in the top portion 133 is defined by an inner cylindrical wall 147 that extends partially into the cavity 134 from the top portion 133. The inner cylindrical wall 147 may be positioned to support a portion of the annular diaphragm element 153b. In embodiments, the inner cylindrical wall 147 is supported by a plurality of radial ribs 146 extending in the cavity 134 at the underside of the top portion 133. An annular groove 142 for receiving an o-ring 143 (FIG. 23) is disposed radially outward of the ribs 146 at the underside of the top portion 133. The o-ring 143 is sealingly engages the top 122 of the filter 120 when the adapter 130 is coupled to the main body 106. The annular groove 142 is defined in part by an inner annular wall 148a. A plurality of spokes 148b extend radially outward from the inner annular wall 148a, connecting to the inner side surface 131b of the body 131. The spokes 148b may be equally spaced about the inner annular wall 148a. The inner annular wall 148a, the spokes 148b, and the inner side surface 131a of the body 131 form a plurality of channels or pockets 149 arranged about a perimeter of the underside of the top portion 133 within the cavity 134. The pockets 149 enable a uniform wall thickness throughout the adapter 130 to facilitate injection molding.

Figure 23:
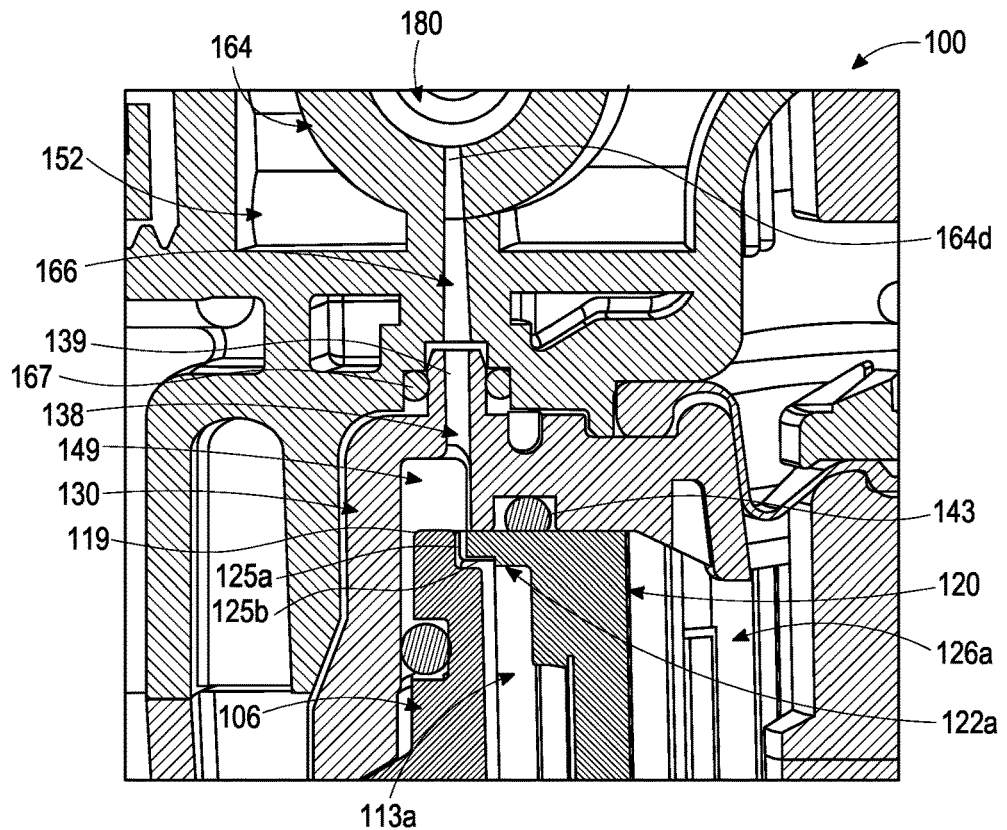
FIG. 23 is an enlarged cross-section view of a portion of the zone control device of FIG. 2 taken along line 23-23 of FIG. 2.
Figure 24:
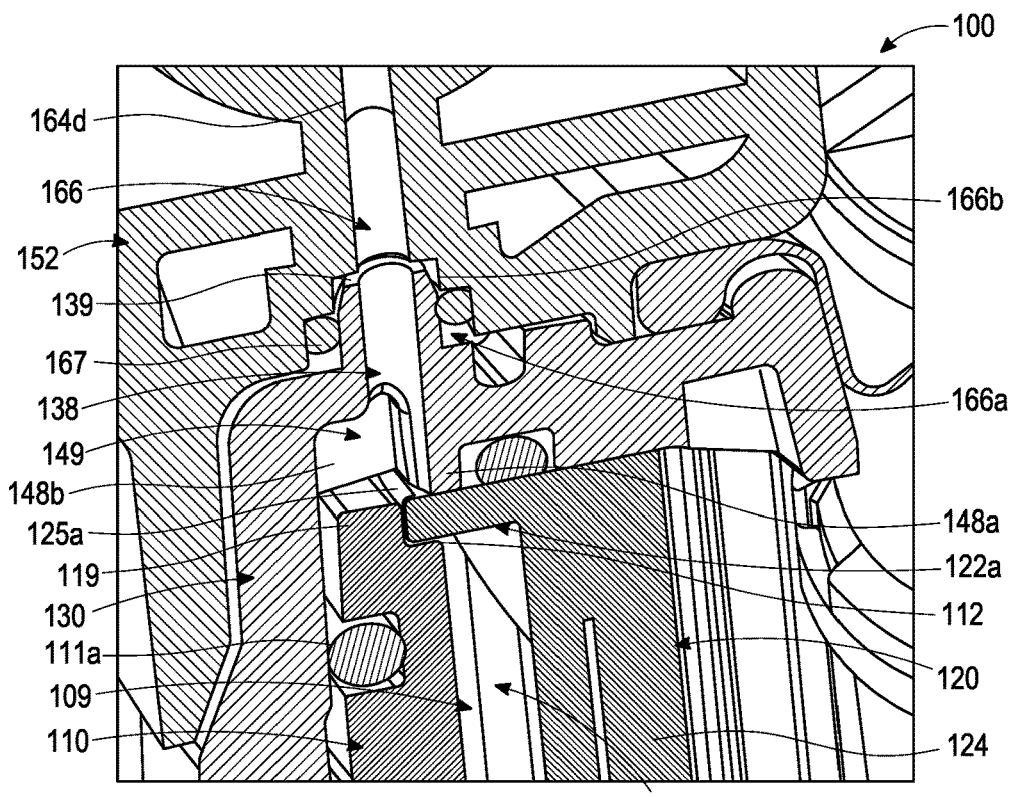
FIG. 24 is an enlarged cross-section view of a portion of the zone control device of FIG. 2 taken along line 24-24 of FIG. 2.
Figure 25:
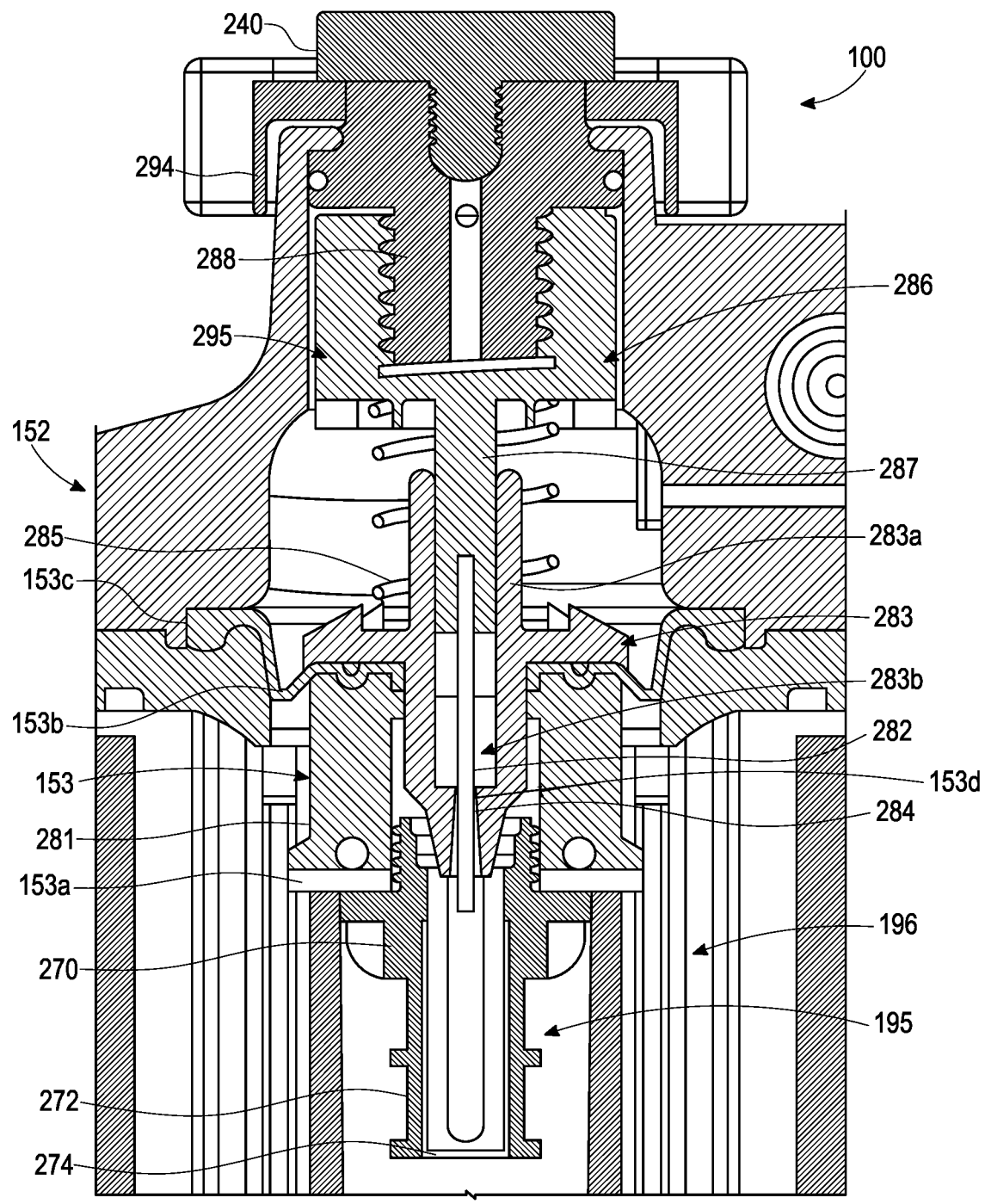
FIG. 25 is an enlarged cross-section view of a portion of the zone control device of FIG. 2 taken along line 3-3 of FIG. 2.
Figure 29:
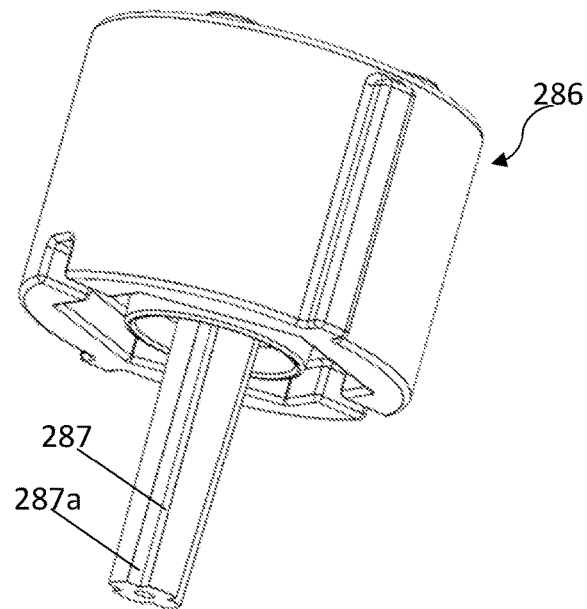
FIG. 29 is a bottom perspective view of a flow control piston of the zone control device of FIG. 2.
Figure 30:
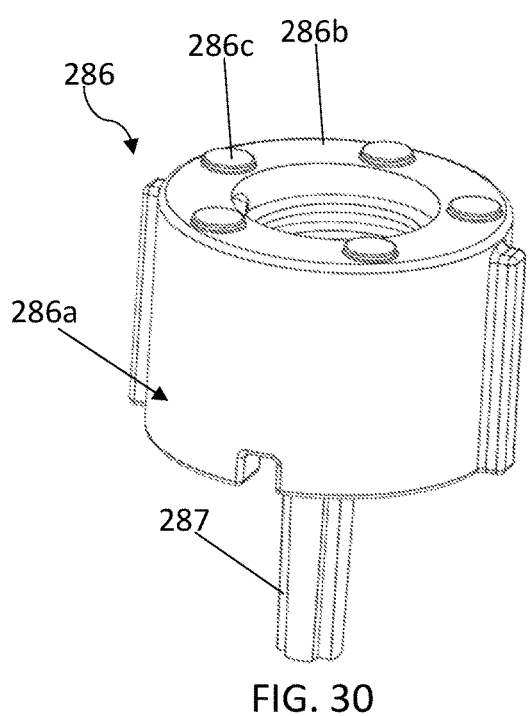
FIG. 30 is a top perspective view of the flow control piston of FIG. 29.
Figure 31:
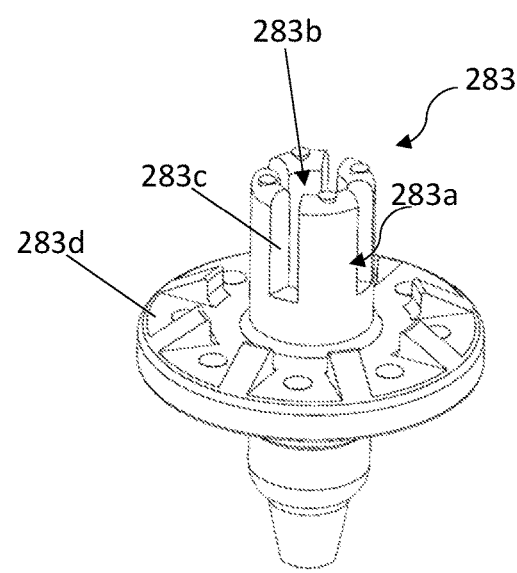
FIG. 31 is a top perspective view of a diaphragm stop of the zone control device of FIG. 2.
Figure 32:
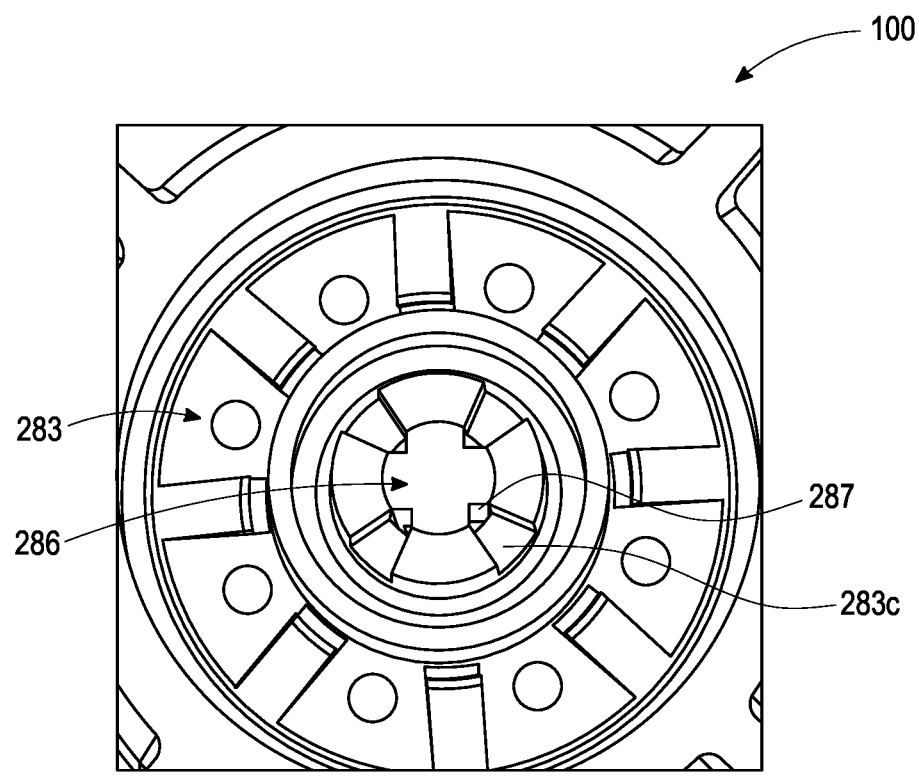
FIG. 32 is an enlarged cross-section view of a portion of the zone control device of FIG. 2 taken along line 32-32 of FIG. 2, showing the flow control piston received in the diaphragm stop.
Figure 33:
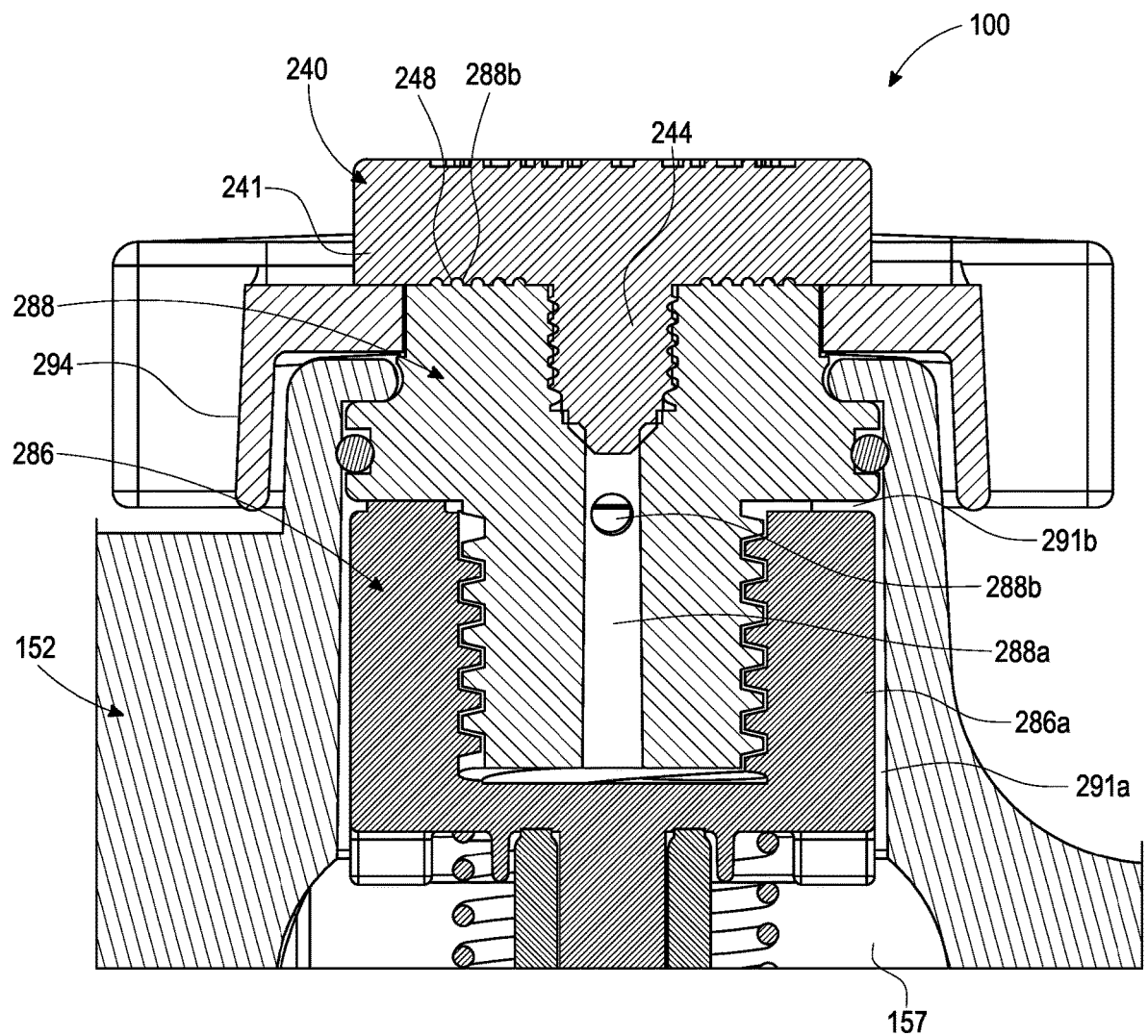
FIG. 33 is an enlarged cross-section view of a portion of the zone control device of FIG. 2 taken along line 3-3 of FIG. 2, showing the manual external bleed pathway.
Figure 34:
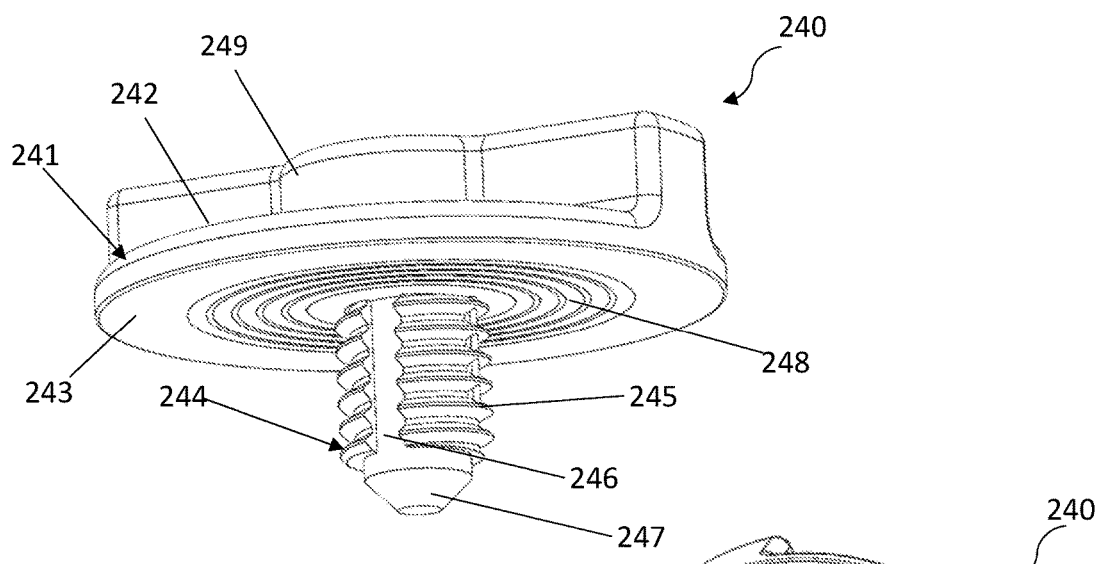
FIG. 34 is a side perspective view of a bleed cap of the zone control device of FIG. 2.
Figure 35:
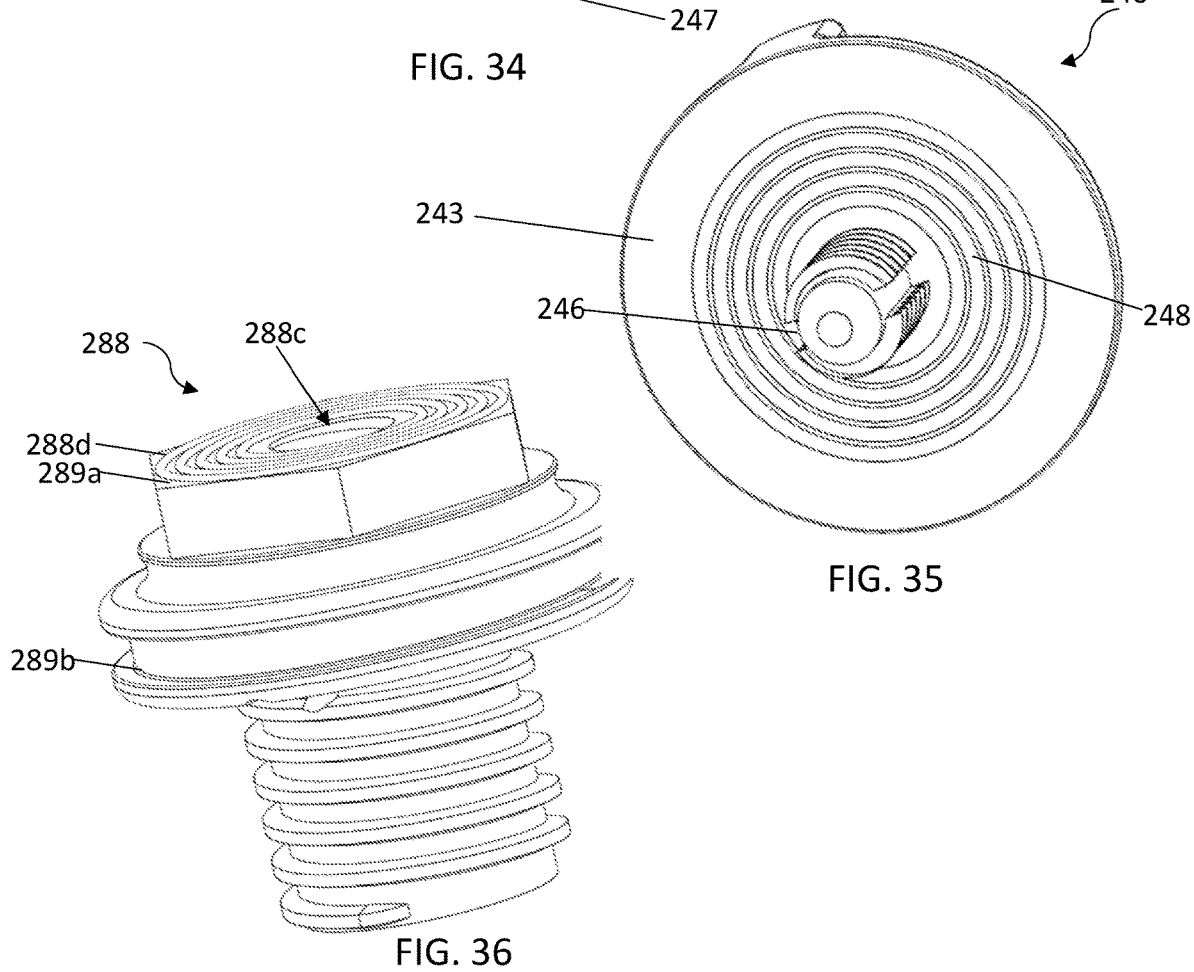
FIG. 35 is a bottom perspective view of the bleed cap of FIG. 34.
Figure 36:
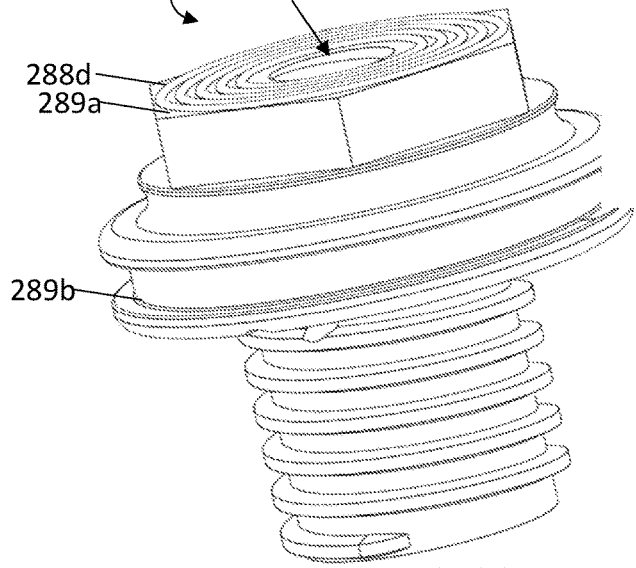
FIG. 36 is a top perspective view of a flow control stem of the zone control device of FIG. 2.

One of the channels 149 is configured to communicate with the vent passage 151 of the bonnet 152 so that the vented fluid can be vented through the adapter 130 to operate the valve. Specifically, an adapter vent passage 138 extends through the top portion 133 of the adapter 130 at one of the channels 149. The adapter vent passage 138 may include a protruding inlet 139 that projects axially from the top portion 133 and is received in a corresponding vent passage socket 166a in the inner annular shoulder 152a of the bonnet 152. As illustrated in FIGS. 23 and 24, an o-ring 167 may be disposed about the protruding inlet 139 and received in the vent passage socket 166a. The o-ring 167 seals the interface between the protruding inlet 139 and the vent passage socket 166a so that fluid is forced only into the protruding inlet 139. In this configuration, the protruding inlet 139 substantially aligns with the pressure regulator vent passage 166 of the bonnet 152.

As described below, the configuration of the vent passages 151, 138 in the bonnet 152 and the adapter 130 is advantageous for a zone control device having a "forward flow" valve configuration. In a forward flow valve configuration, fluid passes into the pressure chamber 157 through a central passage 153d of the diaphragm or diaphragm assembly 153. Thus, the central flow tube 115 is upstream of the valve (i.e., defining part of the inflow side or path 195 of the zone control device 100) so that inlet fluid passes centrally into the pressure chamber 157 even when the valve is closed. The filter 120, accordingly, is downstream of the valve (i.e., defining part of the outflow side or path 196 of the zone control device 100), and the fluid is only filtered after passing the valve seat 114 when the valve 150 is opened.

For proper functioning of a valve 150 of a forward flow zone control device 100, the vented fluid from the pressure chamber 157 needs to be vented to the outflow side 196 of the zone control device 100. For instance, in one approach (not shown), the vent passages 151 and 138 of the bonnet 152 and the adapter 130 may be positioned to dump vented fluid into the interior space 126a of the filter 120 on the outflow side 196 of the valve 150. In this configuration, the vented flow is recombined with the main flow upstream of the filter 120 and passes through the filter 120 on the way to the outlet 104.

However, in the zone control device 100 where the pressure regulator 180 is along the vent flow path to regulate fluid pressure at the valve (described further below), it was found that positioning the pressure regulator vent passage 166 and adapter vent passage 138 so that the vented fluid is vented upstream of the filter 120 can undesirably influence the regulation effect. Specifically, when the filter 120 begins to build up with debris or even clog, fluid pressure builds up in the interior 126a of the filter 120. When the vent passage 166 of the pressure regulator 180 is positioned to communicate vented fluid into the interior 126a of the filter 120 (i.e., upstream of the filter), the pressure build-up in the interior 126a may interfere with the pressure regulator vent passage 166 and the functioning of the pressure regulator 180. Specifically, the pressure regulator 180 senses the pressure within the interior 126a of the filter 120 instead of sensing the outlet pressure (downstream of the filter) and thus regulates the pressure in the interior 126a of the filter 120 to the set point pressure (e.g., 45-50 psi) instead of regulating the outlet pressure to the set point pressure. If the filter is quite clogged, this could result in a very low flow and significantly lower outlet pressure as the water flows through the filter. More specifically, the pressure build-up in the interior 126a due to the clog causes the pressure regulator 180 to reduce the amount of flow venting from the pressure chamber 157, which can result in errant closing or partial closing of the valve 150 and a significant drop in outlet pressure.

The zone control device 100 described herein addresses this by positioning the pressure regulator and adapter vent passages 166, 138 so that the vented flow is dumped downstream of the filter 120. In this manner, the pressure regulator 180 senses and regulates the outlet pressure and not the pressure within the interior 126a of a potentially clogged filter. That is, the condition of the filter 120 does not affect the pressure regulator vent passage 166 and the sensing and functioning of the pressure regulator 180, permitting the pressure regulator 180 to consistently maintain a predetermined pressure range of the outlet fluid.

Specifically, in some examples, the illustrated configuration helps high flows (e.g., about 15 gpm or higher) get past a clogged filter and achieve the outlet pressure set point. As the amount of flow increases, it becomes more difficult for the required amount of flow to get through a clogged filter at the set pressure. In the illustrated configuration, however, increasing the inlet pressure can help drive the flow up to set point when there is a clog. Since in the illustrated configuration the vent passages 166, 138 are positioned to sense the outlet pressure and not the pressure upstream of the filter 120, the pressure regulator 180 senses the low downstream outlet pressure that occurs when there is a clogged filter and permits the valve 150 to be fully open even when the inlet pressure is increased to compensate for the clogged filter. Thus, the valve 150 is not adjusted to reduce the pressure of the flow as the flow passes the valve seat 114 so that the high inlet pressure is maintained upstream of the filter, maximizing outlet pressure downstream of the filter 120. On the other hand, if the vent passages were positioned upstream of the filter 120 and in communication with the filter interior 126a, increasing the inlet pressure would fail to increase the flow through the clogged filter 120. Instead, the increased inlet pressure within the cavity of the filter 120 would be errantly sensed as increased outlet pressure by the pressure regulator 180, and the pressure regulator 180 would regulate the valve 150 to drive the sensed pressure within the clogged filter 120 down to the set point, decreasing the outlet pressure below the set point even further.

FIGS. 23 and 24 illustrate how the zone control device 100 is configured to vent fluid downstream of the filter 120. The fluid from the pressure regulator vent passage 166 is communicated to the adapter vent passage 138 positioned on a periphery of the adapter 130. The fluid flows into one of the plurality of channels 149 directly below the adapter vent passage 138. The channel 149 may be wider than the adapter vent passage 138 to permit some circumferential spreading of the fluid. As illustrated, when the adapter 130 is coupled to the main body 106, the channel 149 is defined by two adjacent ribs or spokes 148b, the inner annular wall 148a, the inner side surface 131b of adapter 130, and the upstanding rim 119 of the main body, while the inner annular wall 148a engages the flange 122a of the filter 120. In addition, the flange 122a of the filter 120 seats on the recessed ledge 112 of the main body 106 while engaging an inner side of the upstanding rim 119. The o-rings 143, 111a seal off other potential fluid pathways between the adapter 130 and the main body 106 and between the adapter 130 and the filter 120 so that the fluid is vented correctly.

In this configuration, the vented fluid is forced down into the space between the main body 106 and the filter 120 via the cut-outs 125 defined in the flange 122a of the filter 120. Specifically, the fluid flows axially through the first portion 125a of the cut-out 125, which provides a path between the flange 122a and the upstanding rim 119 of the main body 106, and radially through the second portion 125b of the cut-out 125, which provides a path between the flange 122a and the recessed ledge 112 of the main body 106. After passing through the cut-out 125, the vented flow enters the space between the main body 106 and the filter 120, for example, at one of the channels 113a between the longitudinal ribs 113 (FIG. 10), joining the main flow downstream of the filter 120 on the outflow side 196 of the zone control device 100 and flowing downstream to the outlet 104. Due to this routing of the vented flow, the upstream vent passages 138, 166 and functioning of the pressure regulator 180 are not undesirably influenced by a clogging filter.

Figure 21:
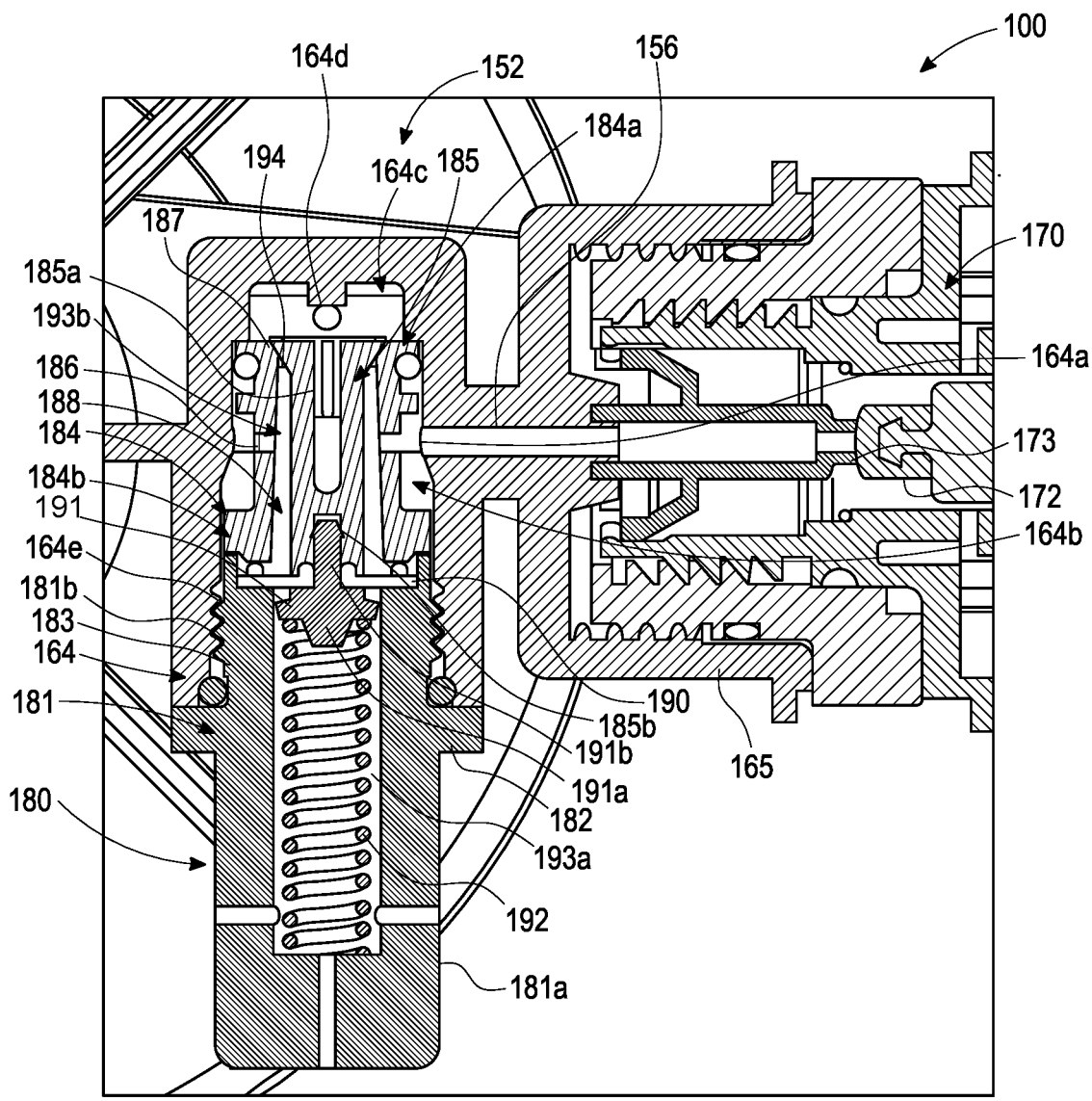
FIG. 21 is an enlarged cross-section view of a portion of the zone control device of FIG. 2. taken along line 21-21 of FIG. 2.
Figure 22:
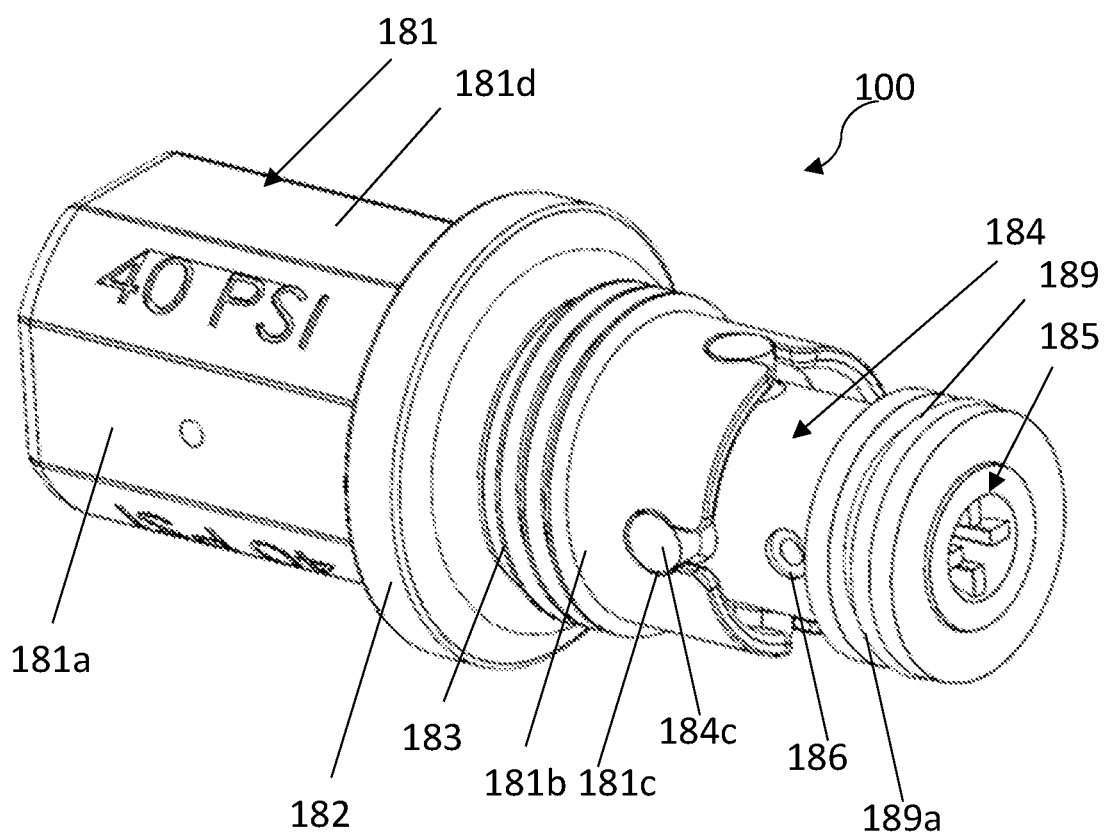
FIG. 22 is a perspective view of a pressure regulator of the zone control device of FIG. 2.

FIGS. 21 and 22 illustrate a pressure regulator 180 for use with the zone control device 100. The pressure regulator 180 is removably threaded into the socket 164 of the bonnet 152. This enables easy removal for maintenance and/or adjustment or replacement of the pressure regulator 180. In the illustrated embodiment, the pressure regulator 180 is a modular pressure regulator having a specific set point to attain a predetermined pressure range. Advantageously, in certain embodiments, different modular pressure regulators having different set points may be interchanged in the socket 164 to match the design, components, or requirements of the irrigation system. In alternative embodiments, the pressure regulator may be an adjustable pressure regulator. While a specific pressure regulator 180 is described below, it will be appreciated that the pressure regulator 180 may have a different configuration and/or mode of operation to regulate pressure at the valve 150 as described below.

The pressure regulator 180 includes a housing 181 having an actuator portion 181a, a base portion 181b, and a flange 182 therebetween. The base portion 181b includes external threads 183 for cooperating with internal threads 164e of the pressure regulator socket 164. The actuator portion 181a includes external flats 181d for turning the pressure regulator 180 to thread it into the pressure regulator socket 164. The flats 181d may be engaged by hand or a manual or powered hand tool. The housing 181 defines an interior chamber 193a housing a spring 192. The flange 182 may bottom out on the socket 164 to stop further insertion into the socket 164.

The base portion 181b of the main housing 181 includes a plurality of c-shaped openings 181c that each receive a corresponding post 184c projecting from a regulator valve case 184. As illustrated, there may be four such c-shaped openings 181c and posts 184c. The regulator valve case 184 is attached to the main housing 181 by being partially received in the housing 181 and snapping the posts 184c into the openings 181c.

An annular inlet chamber 164b is between the regulator valve case 184 and a wall defining the socket 164. The inlet chamber 164b receives fluid from a pressure regulator inlet 164a in the socket 164. Fluid from the inlet chamber 164b flows into the pressure regulator 180 through two diametrically opposed openings 186 in the regulator valve case 184. A socket outlet chamber 164c is downstream of the pressure regulator 180 defined between an inboard end 184a of the regulator valve case 184 and the socket 164. The socket outlet chamber 164c receives fluid from the pressure regulator 180 before the fluid exits via a pressure regulator socket outlet 164d in the socket outlet chamber 164c.

The inboard end 184a of the regulator valve case 184 includes an o-ring 189a seated in an o-ring recess 189. The o-ring 189a seals the wall of the pressure regulator socket 164 with the regulator valve case 184 to prevent fluid in the socket inlet chamber 164b from leaking directly into the socket outlet chamber 164c. Thus, fluid must pass through the pressure regulator 180 to flow from the socket inlet chamber 164b to the outlet chamber 164c.

The main housing 181 and regulator valve case 184 house a pre-loaded poppet valve 185. The spring 192 is designed to a specific load depending on the desired pressure range for the irrigation system. The spring 192 is positioned in the main housing 181 to provide a bias towards the regulator valve case 184 and an open position for the poppet valve 185.

The poppet valve 185 is centrally disposed in an interior 193b of the regulator valve case 184 and interfaces with the spring 192 via a retainer 191. The retainer 191 cooperates with a resilient diaphragm seal 190 at an outboard end 184b of the regulator valve case 184 that separates the interior 193a of the main housing 181 from the interior 193b of the regulator valve case 184. The retainer 191 includes an inboard end 191a configured to engage the spring 192 and an outboard post 191b that extends through an opening in the diaphragm seal 190 and forms an interference fit connection in a socket 185b of the poppet valve 185.

The poppet valve 185, the diaphragm seal 190, and the regulator valve case 184 define a valve chamber 188. The openings 186 permit fluid to flow into the valve chamber 188 from the socket inlet chamber 164b. A valve seat 187 provides an opening from the valve chamber 188 of the regulator valve case 184. The poppet valve 185 operates relative to the valve seat 187 depending on the pressure of fluid in the valve chamber 188.

More specifically, the poppet valve 185 includes a beveled valve face 194 (e.g., about) 45°. The largest diameter portion of the valve face does not pass through the valve seat 187. The valve face 194 moves towards the valve seat 187 to restrict flow and moves away from the valve seat 187 varying distances to maintain a constant pressure for the downstream flow. The poppet valve 185 further includes a central elongated opening 185*a* to reduce the material of the poppet valve 185 so that the thinner plastic cools faster and forms better during manufacturing. This configuration also reduces the cycle-time of the poppet valve 185 in the molding press, which reduces manufacturing costs.

The movement of the poppet valve 185 relative to the valve seat 187 depends on the supply line pressure. For example, when the poppet valve 185 is in its neutral, fully open position, unseated from the valve seat 187, fluid with pressure within the preset pressure range simply flows into the valve chamber 188 from the socket inlet chamber 164*b*, out of the valve chamber 188, and into the socket outlet chamber 164*c*, and subsequently exits via the socket outlet 164*d*, without moving the poppet valve 185. On the other hand, fluid with pressure above the preset pressure range in the valve chamber 188 in combination with backpressure from downstream flow may overcome the spring force biasing the poppet valve 185 toward the open position and drive the valve face 194 of the poppet valve 185 closer to the valve seat 187. This restricts the flow from the pressure regulator 180 into the downstream portions of the vent flow path. Due to the restriction in the vent flow path, pressure builds up in the pressure chamber 157, forcing the diaphragm 153 closer to the valve seat 114 of the valve 150, and reducing the flow and pressure of the main flow as the main flow passes the valve seat 114. In this manner, the pressure regulator 180 in the vent flow path of the valve 150 controls the valve 150 to maintain outlet pressure within the predetermined pressure range or at a desired pressure.

If the pressure is significantly higher than the thresholds set for the pressure regulator 180 (e.g., during a spike), the valve face 194 may be moved into a completely seated or nearly completely seated position on the valve seat 187 to protect the irrigation system. In other words, the spring 192 holds the poppet valve 185 open in an amount determined by the preset pressure regulator setting and the fluid pressure as sensed in the valve chamber 188. In a typical irrigation system, the relative position of the valve face 194 from the valve seat 187 is often in flux to adjust for fluctuations in the fluid supply line pressure and control the flow of fluid through the vent flow path to maintain the outlet pressure within the preset pressure range or at the desired pressure.

The pressure regulator 180 in the vent flow path is advantageous because it enables a compact zone control device 100 with more precise and efficient pressure regulation. The zone control device 100 operates in the following manner.

With reference to FIGS. 3, 20-21, and 23-25, fluid from the inlet 102 flows into the inlet passage 103 and through the central flow tube 115 towards the valve seat 114. The inlet passage 103 and the central flow tube 115 constitute the inflow side 195 of the "forward flow" zone control device 100.

When the solenoid 170 is not energized, a plunger 172 of the solenoid 170 blocks entry of fluid into the solenoid vent passage 156. Thus, fluid that passes into the pressure chamber 157 through the central passage 153*d* of the diaphragm assembly 153 from the inflow side 195 of the zone control device 100 cannot be vented from the pressure chamber 157. The fluid pressure builds up in the pressure chamber 157 causing the diaphragm 153 to close against the valve seat 114 on the flow tube 115. The fluid is blocked from passing from the inflow side 195 to the outflow side 196 of the device 100.

To open the valve 150, the solenoid 170 is energized to open the solenoid vent passage 156 to vent fluid from the pressure chamber 157 to the outflow side 196 of the zone control device 100. As a result, the fluid pressure on the inflow side 195 moves the diaphragm 153 off the valve seat 114 to open the valve 150. In some embodiments, a spring 285, which may be part of a flow control assembly 295, may be in the pressure chamber 157 between the bonnet 152 and the diaphragm assembly 153. The spring 285 provides additional pressure to close the diaphragm 153 and to be overcome when the fluid pressure on the inflow side 195 opens the valve 150. In some embodiments, the force of the spring 285 may be coordinated with the setting of the pressure regulator 180 to ensure that the valve 150 regulates the downstream or outflow pressure to the desired range.

More specifically, the plunger 172 of the solenoid 170 is moved off a secondary valve seat 173 to allow fluid, which entered the solenoid bowl 165 through the pressure chamber vent passage 154, to be vented from the solenoid bowl 165 via the solenoid vent passage 156.

After the plunger 172 is lifted from the secondary valve seat 173, the pressurized fluid from the pressure chamber 157 flows from the solenoid vent passage 156 to the pressure regulator 180. Fluid enters the pressure regulator socket inlet chamber 164*b* via the pressure regulator socket inlet 164*a*. The fluid flows into the valve chamber 188 within the regulator valve case 184 through the openings 186 in the regulator valve case 184. Depending on the pressure of the inlet fluid, the sensed downstream pressure, and the spring force, the poppet valve 185 moves to space the valve face 194 closer or farther away from the valve seat 187, increasing or decreasing the flow of fluid out of the regulator 180 into the socket outlet chamber 164*c*.

Regulating the flow of fluid out of the regulator 180 into the socket outlet chamber 164*c* regulates the rate of flow through the vent flow path. That is, the rate at which the pressure chamber 157 is vented is adjusted by the regulator 180. This, in turn, affects the amount the diaphragm 153 is moved off the valve seat 114 of the valve 150, which has the effect of regulating the flow and pressure downstream.

For example, when the supply line pressure is within the preset pressure range, the valve face 194 of the poppet valve 185 in the pressure regulator 180 is spaced from the valve seat 187 of the pressure regulator 180 so as not to have any or very limited effect on the pressure through the valve 150. More specifically, fluid flows from the pressure regulator 180 into the socket outlet chamber 164*c*, flows out the socket outlet 164*d* into the pressure regulator vent passage 166, passes into the vent passage 138 of the adapter 130 and into the channel 149 of the adapter 130, flows through the cut-out 125 in the flange 122*a* of the filter 120, and passes into the space between the main body 106 and the filter 120 downstream of the filter 120 to rejoin the main flow on the outflow side 196 of the device 100 and flow to the outlet 104.

When fluid from the pressure chamber 157 is vented in this manner without the pressure regulator 180 needing to make an adjustment or restriction, the diaphragm 153 is lifted off the valve seat 114 to its full or standard extent. This allows the pressurized fluid from the inflow side 195 of the device 100 to pass the valve seat 114 and flow to the outflow side 196 of the device 100 with minimal pressure loss. On the outflow side 196, the irrigation fluid is filtered through the filter 120 as it passes downstream and leaves the device 100 through the outlet 204 for delivery to an irrigation zone at an appropriate pressure.

When the supply line pressure is above the preset pressure range, the valve face 194 of the poppet valve 185 in the pressure regulator 180 moves closer to the valve seat 187 of the pressure regulator 180 and decreases the flow of fluid from the pressure regulator 180 into the downstream passages of the vent flow path. Though venting of the pressure chamber 157 still occurs, the net balance of the fluid being vented more slowly from the pressure chamber 157 and the high-pressure inlet fluid entering the pressure chamber 157 limits the amount that the diaphragm 153 is lifted off the valve seat 114. That is, the diaphragm 153 is not opened to its full extent, limiting the flow and pressure of the fluid as it passes to the outflow side 196. The amount of restriction at the diaphragm 153 and valve seat 114 is correlated with the amount of restriction created by the pressure regulator 180. This results in the fluid flow from the device 100 being in the desired pressure range.

Regulating pressure using the valve 150 has advantages over a pressure regulator being in the conduit for delivering fluid to the irrigation system. More specifically, a pressure regulator in the conduit typically consumes space ordinarily needed for flow. Thus, the total amount of flow through the pressure regulator, and thus to the downstream system, is reduced. In other words, by regulating pressure using the vent flow path, the main flow path of the fluid is not "choked" up at a pressure regulator.

The configuration also allows for more precise and consistent pressure reduction to the preset pressure threshold because less overall pressure loss occurs compared to a pressure regulator disposed in the conduit. When a pressure regulator is in the conduit, the flow of fluid is subjected to pressure loss as it passes through the pressure regulator. On the other hand, when the pressure regulator is in the vent flow path, the entire flow of fluid is not subjected to this pressure loss.

Figure 1:
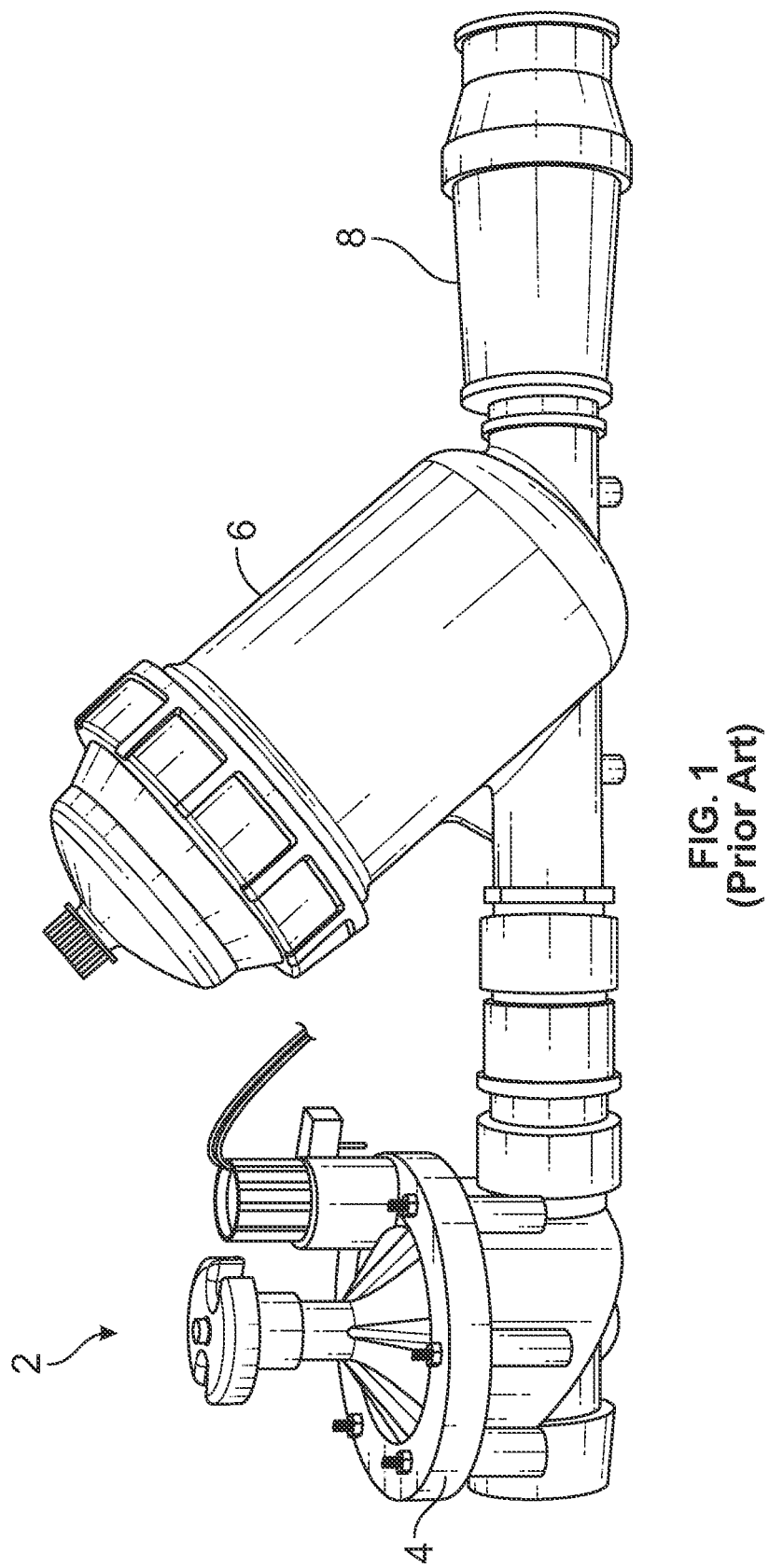
FIG. 1 is a perspective view of a known zone control assembly having a valve, filter, and pressure regulator connected in series.

More generally, the zone control device 100 having the valve, the filter, and the pressure regulator "compacted" into a single device also contributes to increased performance characteristics and efficiency of the system. For example, using multiple individual components assembled in series (e.g., see FIG. 1) can require a higher inlet pressure to achieve a desired outlet pressure. The zone control devices described herein, and particularly when the pressure regulator is in the vent flow path, are less restrictive on the flow and result in less overall pressure loss. The effect is that a lower inlet pressure can be used and still achieve the desired outlet pressure. Moreover, specifically configuring the vent flow path in a zone control device to vent fluid downstream of the filter avoids a clogging filter having an undesirable effect on the pressure regulator in the vent flow path, as explained above.

The zone control device 100 includes additional features that enhance the operation of the device 100. For instance, with reference to FIGS. 25-28, a filter nut 270 of the diaphragm assembly 153 is shown. The filter nut 270 attaches the filter 274 to the diaphragm assembly 153 to filter fluid that passes through the central passage 153d of the diaphragm assembly 153 into the pressure chamber 157. Advantageously, the filter nut 270 includes a hollow projection 272 that encloses and protects an otherwise exposed filter 274 when the bonnet 152 and adapter 130 are decoupled from the main body 106 of the device 100 during replacement of the filter 120 or maintenance, for example as shown in FIG. 9.

The filter nut 270 has a hollow body 271 defining a central passage 271a. The body 271 includes a threaded stem 271b for attaching to the diaphragm assembly 153, a widened flange portion 271c, and the hollow projection 272 extending axially from the flange portion 271c. A top surface of the flange portion 271c may include an annular recess 271d for receiving a corresponding bead of the diaphragm seal 153a. When positioned in the diaphragm assembly 153, the diaphragm seal 153a may be seated on the flange portion 271c with the hollow projection 272 of the filter nut 270 extending below the diaphragm seal 153a and containing the filter 274 inside the projection 272. The width or diameter of the flange portion 271c is sized so that the flange portion 271c is received within the flow tube 115 and at least partially blocks flow from the flow tube 115 to downstream of the valve seat 114 under low flow conditions. In some embodiments, at least a portion of the flange portion 271c abuts or nearly abuts the inner wall of the flow tube 115 to block most of the flow across the valve seat 114 until the diaphragm assembly 153 is moved a sufficient amount off the valve seat 114. Under low flow conditions, the diaphragm assembly 153 achieves this displacement because the blockage from the flange portion 271c causes the valve to not supply enough downstream pressure to cause backpressure on the diaphragm assembly 153 and force the diaphragm assembly 153 into a lower equilibrium position. Thus, pressure on the underside of the diaphragm assembly 153 upstream of the valve 150 drives the diaphragm assembly 153 farther from the valve seat 114 until an equilibrium at a higher position of the diaphragm assembly 153 is achieved. The additional axial displacement between the valve seat 114 and the diaphragm assembly 153A allows sufficient clearance for the pressure regulator 180 to adjust movement of the diaphragm assembly 153 under low flow conditions without causing the valve to chatter.

A lower portion of the flange portion 271c may include one or more pockets 271e to facilitate passage of fluid through the annulus between the flange portion 271c and the flow tube 114 towards the valve seat 114 when the diaphragm assembly 153 is lifted off the valve seat 114. A rounded edge of the lower portion of the flange portion 271c also facilitates flow and limits pressure loss.

The hollow projection 272 includes a plurality of longitudinal extensions 272a spaced in an annular configuration to define a portion of the central passage 271a. One or more annular collars 272b encircle the longitudinal extensions 272a and connect them together. For instance, there may be a first annular collar positioned about an intermediate portion of the longitudinal extensions 272a and a second annular collar spaced from the first annular collar positioned about the longitudinal extensions 272a at an entry opening 273c to the central passage 271a. The spaced longitudinal extensions 272a and annular collars 272b may provide the projection 272 with a grid pattern, defining windows 272c so that inlet fluid can pass through the projection 272 into the filter 274.

The zone control device 100 also includes enhancements to the pilot flow path from the inflow side 195 of the valve into the pressure chamber 157. FIGS. 25 and 29-32 illustrate components of the flow control assembly 295 and diaphragm assembly 153 relevant to the pilot flow path and are described below.

In the pilot flow path, inlet fluid first flows from the inflow side 195 of the valve into the filter nut projection 272 and the filter 274. Once inside the filter 274, the filtered fluid flows up through the central passage 153d of the diaphragm assembly 153 towards the pressure chamber 157.

Specifically, the fluid flows into a passage 283b of a diaphragm stop 283. The diaphragm stop 283 includes a guide cylinder 283a and an annular flange 283d extending radially from an intermediate portion of the guide cylinder 283a. A portion of the annular diaphragm element 153b is captivated between one side of the flange 283d and the diaphragm insert 281. The spring 285 is positioned about the guide cylinder 283a, between the flange 283d and a base 286a of the flow control piston 286. The diaphragm stop 283 includes a metering orifice 284 upstream of the guide cylinder 283a and a metering rod 282 extends through the metering orifice 284 from the guide cylinder 283a. The fluid flows through an annulus around the metering rod 282 before flowing into the interior 283b of the guide cylinder 283a.

The guide cylinder 283a is sized to receive and guide movement of a guidepost 287 of the flow control piston 286. The position of the flow control piston 286 of the flow control assembly 295 can be adjusted to control flow through the valve. Specifically, the flow control piston 286 is selectively movable axially within the pressure chamber 157 via the flow control handle 294. Turning the flow control handle 294 adjusts flow through the valve by moving the flow control piston 286 to selectively pre-load the spring 285 to change the biasing force against the diaphragm 153. As the flow control piston 286 is lowered from an initial full-flow condition (FIG. 25) to a reduced flow condition (FIG. 3), the biasing force of the spring 285 increases, requiring more force to urge the diaphragm 153 away from the valve seat 114 and thereby reducing the flow rate across the valve. If the force required to close the valve 150 exceeds the load the spring 285 on its own can supply, continued lowering of the piston 286 until it directly engages the guide cylinder 283a causes the piston 286 to exert additional downward pressure on the diaphragm assembly 153 toward the valve seat 114.

The guidepost 287, guide cylinder 283a, and the metering rod 282 cooperate to keep the diaphragm seal 153a parallel to the valve seat 114 and concentric with respect to one another.

The guide cylinder 283a of the diaphragm stop 283 includes a plurality of elongate openings 283c disposed axially in a wall thereof downstream of the flange 283d. As illustrated, the elongate openings 283c may extend all the way through a terminal end of the guide cylinder 283a. In some embodiments, there may be four elongate openings 283c equally spaced about the guide cylinder 283a.

The guidepost 287 of the flow control piston 286 includes a plurality of grooves 287a. The grooves 287a, for example, may each extend substantially an entire length of the guidepost 287. In one embodiment, there are four grooves 287a equally spaced about the guidepost 287. When the guidepost 287 is received within the guide cylinder 283a, fluid flows through the grooves 287a and out the elongate openings 283c of the guide cylinder 283a into the pressure chamber 157.

With reference to FIGS. 25 and 33-36, the zone control device 100 may further include a manual external bleed flow path and a bleed cap 240. These features permit external bleeding of fluid or air from the pressure chamber 157. The manual bleeding has several functions such as removing air from the valve, flushing debris from the valve, or manually turning on the valve by bleeding fluid from the pressure chamber off the diaphragm. One problem with typical manual bleed designs is that fluid can spray at a high velocity and spray the operator when the bleed flow path is opened. The bleed cap 240 and bleed flow path described are directed to this spray effect.

The bleed cap 240 may be at the top of the valve bonnet 152 above the pressure chamber 157. The bleed cap includes a disc portion 241 that seats at least in part on the flow control handle 294 and the flow control stem 288, exposed and accessible to the user. In embodiments, the bleed cap 240 includes a handle 249 on an upper surface 242 of the disc portion 241 to facilitate turning the bleed cap 240 to open and close the manual bleed flow path. A threaded projection 244 extends axially from a central region of a lower surface 243 of the disc portion 241. The threaded projection 244 extends into a threaded socket 288c of the flow control stem 288. The threaded projection 244 threadingly engages the threaded socket 288c to axially move the bleed cap 240 to open and close the manual bleed flow path.

Specifically, in the manual bleed flow path, fluid from the pressure chamber 157 first flows into an annulus 291a between the base 286a of the flow control piston 286 and the bonnet 152. The fluid subsequently flows radially towards a central passage 288a of a flow control stem 288 via an annular gap 291b between the flow control piston 286 and a portion of the flow control stem 288. A minimum annular gap 291b is always maintained, even when the flow control piston 286 is fully raised, due to a plurality of posts 286c (FIG. 30) spaced about the upper surface 286b of the flow control piston 286 that serve to space the flow control piston 286 from the flow control stem 288. The fluid enters the central passage 288a of the flow control stem 288 via one or more holes 288b in the flow control stem 288. The central passage 288a is continuous with the threaded socket 288c. In embodiments, the threaded socket has a larger diameter than the central passage 288a.

When the bleed cap 240 is turned in a first direction to a closed position, the bleed cap 240 moves axially towards the flow control stem 288 and a tapered tip 247 of the threaded projection 244 substantially blocks flow between the central passage 288a and the threaded socket 288c. When the bleed cap 240 is turned in an opposite direction to open the manual bleed flow path, the bleed cap 240 moves axially away from the flow control stem 288, unblocking the flow from the central passage 288a into the socket 288c and permitting fluid to flow axially through the socket 288c. The upward movement of the bleed cap 240 spaces the lower surface 243 of the disc portion 241 away from the flow control stem 288 so that fluid can flow radially through a gap created therebetween and out of the device 100.

In embodiments, the threaded projection 244 includes discontinuous threading 245. For instance, the discontinuous threading 245 may define one or more slots or channels 246 to provide clearance for fluid to pass through the socket 288c when the threaded projection 244 is disposed therein. For instance, in one approach there are two opposing slots 246.

Advantageously, fluid is not expelled from the manual bleed flow path at a high velocity, lessening the risk of undesirable spraying. This is due to a turbulence-inducing tortuous pathway defined between the bleed cap 240 and the flow control stem 288. Specifically, the lower surface 243 of the disc portion 241 of the bleed cap 240 includes a plurality of concentric annular grooves 248. The upper surface 289a of the flow control stem 288 includes a plurality of corresponding annular ribs 288d sized and positioned to engage the annular grooves 248. In the closed position of the bleed cap 240, the annular grooves 248 may entirely receive or nearly completely receive the annular ribs 288d. When the bleed cap 240 is turned to open the manual bleed flow path, a gap is created between the annular grooves 248 and the annular ribs 288*d*. The undulating surfaces of the annular grooves 248 and the annular ribs 288*d* induce turbulence in the flow through the radial gap and encourage circumferential spreading and radial diffusion of the flow. When the flow emerges out of the bleed cap 240 the pressure and velocity of the flow is significantly slowed, thereby reducing splashing or spraying of the operator.

Figure 37:
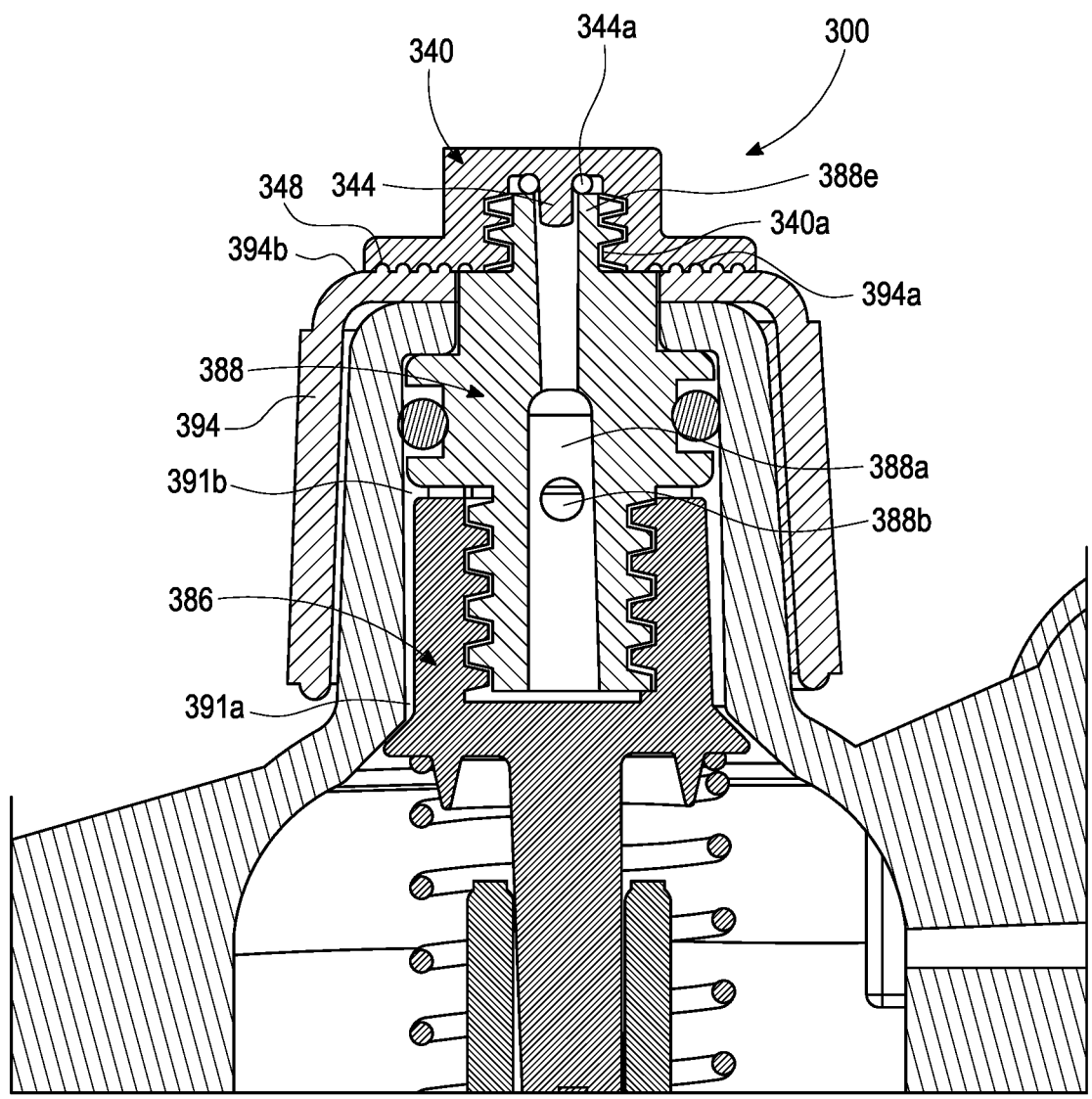
FIG. 37 is an enlarged central cross-section view of an alternative embodiment of a manual external bleed pathway for an alternative zone control device.

FIG. 37 illustrates an alternative embodiment of a bleed cap 340 on a zone control device 300. Some of the features of the bleed cap 340 and manual bleed flow path are the same as those discussed above for bleed cap 240. The common features may not be specifically referenced in this description of the bleed cap 340 and manual bleed flow path but are incorporated by reference and will be denoted with the same number except that the number will begin with a "3".

In this embodiment, the bleed cap 340 includes a threaded cavity 340*a* that receives and cooperates with a threaded hollow projection 388*e* extending axially from the flow control stem 388. The central passage 388*a* of the flow control stem 388 extends through the threaded hollow projection 388*c*. A post 344 extends partially into the central passage 388*a* from a ceiling of the cavity 340*a* of the bleed cap 340. An o-ring 344*a* is carried on the post 344. In the closed position of the bleed cap 340, the o-ring 344*a* seals between the threaded hollow projection 388*c* and the bleed cap 340, preventing fluid from flowing from the central passage 388*a* of the flow control stem 388. When the bleed cap 340 is turned to open the manual bleed flow path, the o-ring 344*a*, carried by the post 344, and helped by water pressure, is unseated from engagement with the threaded hollow projection 388*c*. Fluid subsequently flows between the bleed cap 340 and the threaded hollow projection 388*e* and then through a gap between an annular flange of the bleed cap 340 and the flow control handle 394 to be discharged.

Like the previous embodiment, annular mating grooves and ribs are present to induce turbulence and radial diffusion of the flow as it exits the manual bleed flow path to reduce velocity and spraying of the discharged fluid. However, in this case the ribs 394*a* are disposed on an upper surface 394*b* of the flow control handle 394 instead of on the flow control stem 388. In addition, in either embodiment, the ribs and grooves may be reversed (e.g., with the ribs disposed on the bleed cap and the grooves disposed on the flow control handle or the flow control stem).

The zone control devices described herein also may include one or more of a variety of sensors integrated at certain locations within the devices to sense and relay flow information to a controller. Accordingly, systems and methods for monitoring and controlling flow through the zone control devices are also described herein.

Figure 39:
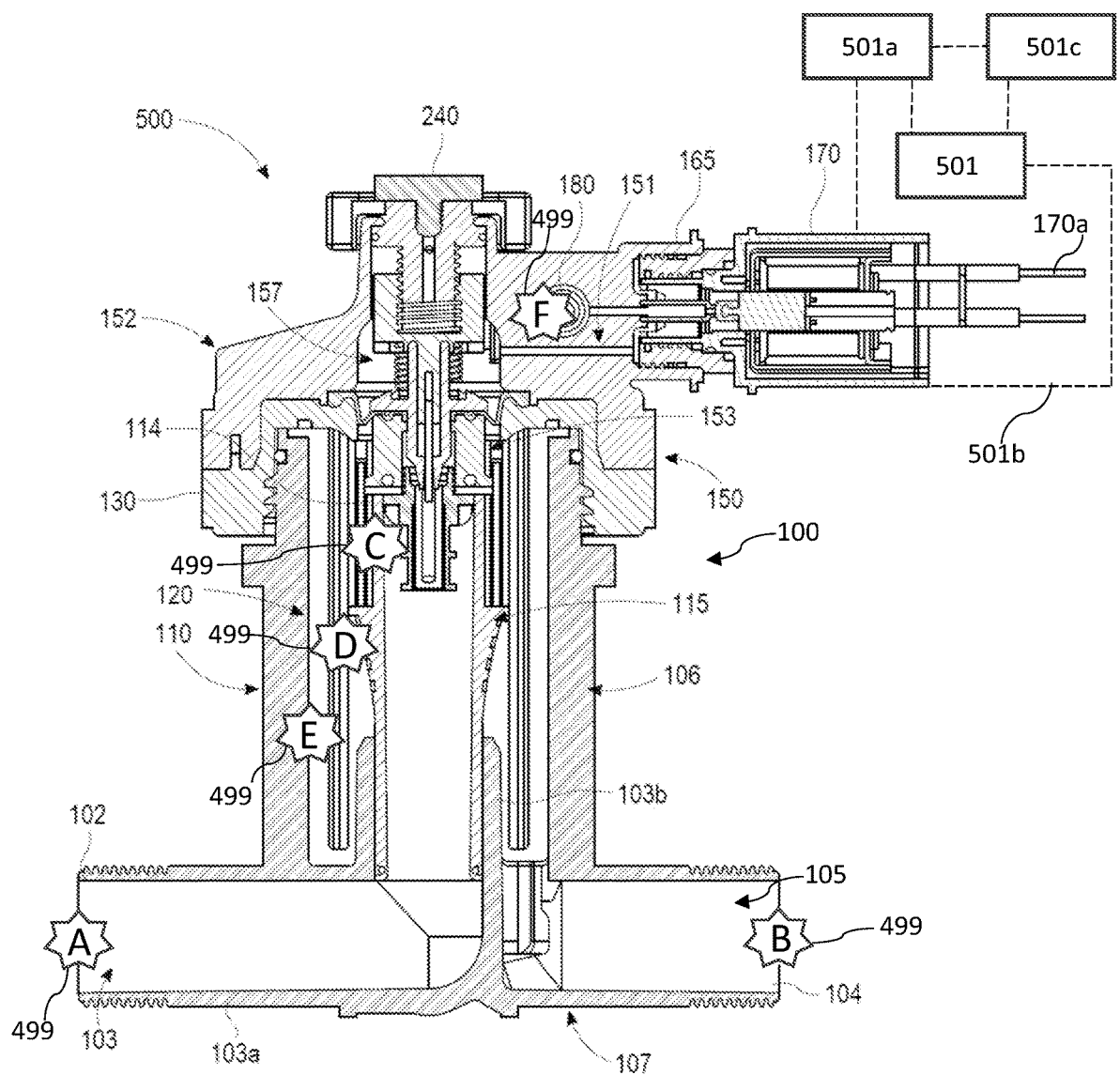
FIG. 39 is a schematic view of an exemplary system for monitoring flow using the zone control device of FIG. 2 and sensors.

FIG. 39 illustrates an exemplary system 500 showing a controller 501, a subcontroller or local controller 501*a*, a remote device 501*c*, and zone control device 100 having one or more sensors 499 approximately located at locations A, B, C, D, E, and/or F.

The sensor 499 may be a pressure sensor used in a variety of locations. For instance, a sensor at or near the inlet 102 (location A) can be used for determining available pressure when water is flowing through the valve and when water is not flowing through the valve. The sensor may be placed in the device 100 or in the conduit adjacent the inlet 102. The sensed pressure at the inlet 102 can be used to determine pressure loss as water flows through the device 100 or determine whether the valve is on or off. For example, a pressure drop (such as when compared to normal operation data) that occurs in the valve OFF state indicates a leak through the valve and in the valve ON state indicates that water is flowing through the valve. A pressure drop may also indicate a supply line break or supply pump failure.

A sensor 499 can also be placed at or near the outlet end of the device 100 (location B). The sensor may be placed in the device or in the conduit adjacent the outlet 104. This data can be used to determine available pressure after water is flowing through the device and to verify there is water pressure when the valve state is ON or no water pressure when the valve state is OFF. The data can also be used as part of a pressure loss measurement when water flows through the valve when compared to data from the sensor 499 at location A.

A sensor 499 may be a differential pressure sensor that is at a location (e.g., location C) to take measurements from both sides of the valve seat 114. For instance, the sensor 499 can be embedded in a wall of the flow tube 115 and exposed to fluid on both sides of the wall. In this configuration, the sensor 499 can determine whether the valve is working properly, i.e., that there is water pressure when the valve is supposed to be ON and no water pressure when the valve is supposed to be OFF. A sensor (e.g., a pressure differential sensor), also can be located at an upstream and downstream side of the filter 120 (e.g., locations D and E) to monitor the health of the filter 120, as described in further detail below.

In addition, a sensor 499 can be placed between the filter 120 and the valve seat 114 (e.g., location D) to differentiate whether a pressure loss is due to pressure loss at the valve 150 or the filter 120.

The sensor 499 also can be a flow sensor. Flow sensors can be placed in the zone control device 100 to determine, for example, whether fluid is flowing or the flow rate when a specific water dispersion device is used (e.g., a spray sprinkler, a rotor sprinkler, or a drip line). Flow sensors also can be used to track changes in flow rates to determine issues in the device 100, such as restrictions caused by the filter or valve functioning, as well as to initiate certain events. For instance, depending on the amount of flow sensed, a flow sensor signal could be used by the controller 501 to extend or reduce watering. In some cases, a high differential pressure relative to flow could activate a light or other visual indicator on the device 100 or the controller 501 to indicate the filter 120 needs to be changed, a message or other signal may be sent to a user via a smartphone to change the filter 120, and/or an increased period of watering may be initiated due to reduced flow.

The sensor 499 also may be a temperature sensor. Temperature sensors may be useful for determining timing of winterization of the irrigation system or to detect quick changes in temperature and/or initiate fire abatement. They may also be used to suspend or interrupt an irrigation event during a freeze condition. For example, a temperature sensor can be placed within the device 100 anywhere in the stream of the water to measure the temperature of the water or on an exterior surface of the device 100 to measure air temperature. By another approach a sensor 499 also can measure coil resistance in the solenoid 170 which can correlate to air temperature.

The sensors 499 described herein could use a number of different outputs, such as voltage output, current output, frequency output, duty cycle output, and other known outputs.

The data collected by sensors 499 can be relayed to the controller 501. Any number of controllers known in the art that are configured to receive the above-described sensor data may be used. In addition, a self-powered valve may be used with its own power generation unit for irrigation control, for example as disclosed in U.S. Provisional Application No. 63/437,992 filed on Jan. 9, 2023, the contents of which are incorporated by reference herein in their entirety. Sensor data also can be sent to a subcontroller or local controller 501a located near or connected to the device 100. The subcontroller 501a may consolidate the signals from different sensors 499 and send the signals to the main controller 501. Consolidated information could be sent using various output forms as part of a carrier output to the main controller 501 or other communications devices. For instance, in addition to or instead of the controller 501, the information could be sent to another server, processer, or remote device (e.g., a smart phone) 501c to be accessed via a user or manager of the irrigation system.

The sensor data or other information may be transmitted between the device 100, the sensors 499, the controllers 501, 501a, or other remote devices 501c through any suitable wired or wireless modes of communication 501b, such as via a solenoid data link, or via other wireless communication methods known in the art (e.g., Blue Tooth, Wi-Fi, RFID, LoRa, Zigbee, etc.).

By one approach, the main controller 501 can send one or more signals back to the local controller 501a. For instance, the signals may include a command that was determined based on the sensor information. For instance, a command may be sent to adjust the duration of the watering period or stop watering.

Data can be collected at the controller 501 or subcontroller 501a from the sensors 499 at varying rates. For instance, data can be collected frequently (e.g., every minute or second) or less frequently (e.g., once a day, week, or month). The data collection rate also could be based on different circumstances. For instance, when the valve state is ON, the sensor data can be set to be collected more frequently than when the valve state is OFF.

In one approach, a sensor 499 may be located in the pressure regulator 180 (e.g., at location F). More specifically, for instance, a micro load sensor, such as an 8 mm load sensor, may be located at the end of the spring 192 in the pressure regulator 180 to detect the load on the spring 192. Voltage is supplied to the sensor 499 and outputs a data signal based on the load. The signal may, for instance, be sent at a 1 kHz rate. The solenoid 170 may utilize a data link, and data may be transmitted from the sensor 499 to the main irrigation controller 501 via a data link on the solenoid 170, though other forms of communication are contemplated.

The main controller 501 may read the voltage level being sent from the load cell of the sensor 499 and may monitor any increases or decreases in pressure being applied to the load cell of the sensor 499. The load cell has a baseline value when the valve state is OFF and the spring 192 has a preset compression to open and close the pressure regulator poppet valve 185 of the pressure regulator 180 and maintain a constant outlet pressure. The sensor 499 may detect the change in force the spring 192 is exerting to maintain a constant outlet pressure and may transmit the data to the controller 501 or subcontroller 501a. In this case, an increase in pressure on the spring 192 directly correlates to the poppet valve 185 decreasing flow through the poppet valve 185, which correlates to a decrease in the distance the diaphragm 153 lifts off the valve seat 114 and a decrease in flow through the main valve 150 of the device 100. A decrease in pressure detected by the controller 501 directly correlates to the poppet valve 185 increasing flow through the poppet valve 185, which may correlate to an increase in the distance the diaphragm 153 lifts off the valve seat 114 and an increase in flow through the main valve 150. Alternatively, it is also possible for a pressure sensor 499 to be located downstream of the poppet valve 185 to detect the pressure of the flow from the pressure regulator 180.

If a pressure or flow sensor 499 is also located at or near the inlet 102 (location A), inlet pressure or flow data may also be transmitted to the controller 501 and used with the pressure regulator sensor data to precisely calculate any flow increases or decreases that may signal a problem. For instance, a decreased pressure or increased flow at the pressure regulator 180 relative to the inlet data may indicate a leak in the zone downstream of the device 100. If inlet pressure data is not available, the controller 501 may be set to assume the inlet pressure is static within a certain range percentage in order to detect potential problems.

In another application, a differential pressure sensor can measure the pressure difference across the valve seat 114. For instance, the sensor 499 may be molded into the flow tube 115 with one side of the sensor 499 on the inside of the tube 115 and the other on the outside of the tube 115 (e.g., location C). The controller 501 can then determine the change in pressure from the inflow side 195 to the outflow side 196 of the device 100. The controller 501 can be set to assume that the outflow pressure adjacent the valve seat 114 is constant within a specific range since it is controlled by the pressure regulator 180. With respect to zone control devices in which the filter 120 is on the outflow side of the device, such as zone control device 100, any increase in outflow pressure detected by the sensor 499 molded into the flow tube 115 relative to the expected outflow pressure could indicate that the filter 120 needs to be cleaned.

In addition, since zone control device 100 regulates the outflow pressure to within a specific range, the distance the diaphragm 153 lifts off the valve seat 114 can be determined based on the pressure differential between the inflow side 195 and the outflow side 196. Based on the distance of the diaphragm 153 lifts off the valve seat 114, the area of flow through the valve 150 and the flow rate through the valve 150 can be determined.

In a further approach, pressure on the inflow side 195 may be calculated by measuring the position of the diaphragm 153, and this may be used to calculate the flow rate through the valve 150. For instance, the position of the diaphragm 153 may be measured by affixing a piece of metal to the diaphragm assembly, mounting a capacitance or inductance probe in the bonnet, and using the signal off the probe as an input into a calculation that relates diaphragm position, pressure, and flow.

In either approach, sensor data can be sent from the device 100 to the controller 501, using, for example, solenoid data channels, and the controller 501 can determine and monitor the changes in flow rate. For instance, when the flow rate drops below a preset threshold, this may indicate that the filter needs to be cleaned or replaced, or may indicate other nonfunctioning components. If a higher-than-expected flow rate is detected in the device 100, this may indicate a leak somewhere in the irrigation system (e.g., at a sprinkler) downstream of the device 100.

Figure 40:
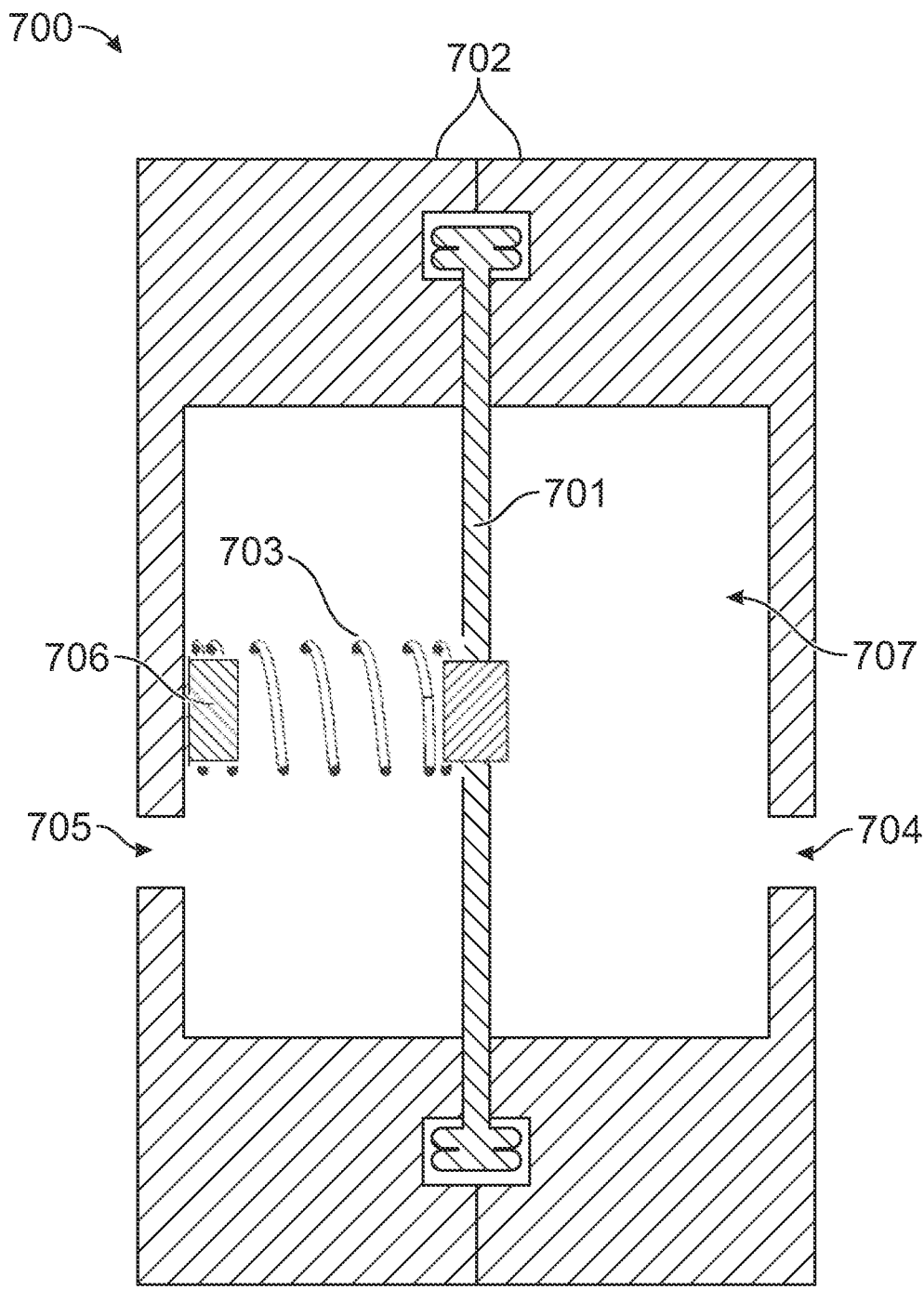
FIG. 40 is a diagrammatic view of a differential-pressure sensor.

In another approach, a differential pressure sensor 499 can indicate a clogged filter 120 when detecting a pressure drop across the filter screen. For instance, the sensor 700 illustrated in FIG. 40 may be placed on a filter screen of the filter 120 (e.g., between locations D and E in FIG. 39). Specifically, the sensor 700 may include a diaphragm 701 enclosed by two clamshell housings 702. The diaphragm 701 may be centrally disposed in an interior 707 between the two housings 702 and configured to deflect to close a switch 706 when a pre-determined pressure drop is detected between an upstream side 704 of the filter screen and a downstream side 705 of the filter screen. For instance, the switch 706 may be closed when there is a pressure differential between the upstream side 704 and the downstream side 705 that indicates the filter 120 is clogged and needs to be replaced. In some embodiments, a biasing element 703 such as a spring (e.g., a compression coil spring) may be present between the diaphragm 701 and the switch 706 to increase the force required to close the switch 706. In some approaches, the spring 703 and spring load may be selected depending on the requirements of the irrigation system. Closing the switch 706 could trigger a number of events. For instance, activation of the switch 706 may interrupt the common 170*a* (FIG. 39) and turn off the valve 150. Alternatively, activation of the switch 706 may interrupt a current coming from the controller 501 to trigger an alert, a light, or other indicator at the controller 501 that the filter 120 needs to be cleaned or replaced. In addition, the switch 706 can be activated in its default state and deactivation of the switch 706 may trigger any of the above-mentioned events.

In an additional approach, a sensor 499, such as a differential pressure sensor, may be used to monitor the health of the filter 120. As the filter 120 catches debris, this debris can reduce flow through the filter 120. This can result in a pressure drop across the filter 120 which can be an indicator for filter health. The differential pressure sensor includes a pressure sensor upstream of the filter 120 and another pressure sensor downstream of the filter 120 (e.g., FIG. 39, locations D and E). The signaling from the sensors is coupled to a control, such as a main controller or processor 501, subcontroller 501*a* or microcontroller, circuit, etc., that interprets the signaling and can output data to be transmitted to a remote device 501*c* using an interface (wired or wireless interface). The data may include the signaling, data corresponding to the signaling, and/or pressure determinations based on the signal.

In this approach, a curve can be created for various levels of filter clogging so that a variable output can be determined and provided. A low-pressure differential may indicate that the filter 120 is new, while a higher pressure differential may indicate the filter 120 needs cleaning or replacing. To the user, the health of the filter 120 may be displayed as a percentage and/or there may be an indication (e.g., a light at the controller panel) as to whether or when the filter 120 may need to be cleaned or replaced.

Further, while a given pressure differential may correspond to the filter 120 being clogged at one flow rate, the same pressure differential may not correspond to the filter 120 being clogged at a different flow rate. Thus, in some embodiments the differential pressure is characterized for different flow rates for greater accuracy. For instance, a curve would be developed for each of several different flow rates. Knowledge of the flow rate together with the differential pressure measurements ensures that the proper pressure curve is used to determine filter health. Further details regarding this approach of monitoring filter health are disclosed in U.S. Provisional Application No. 63/437,992 filed on Jan. 9, 2023, the contents of which are incorporated by reference herein in their entirety.

The matter set forth in the foregoing description and accompanying drawings is offered by way of example and illustration only and not as a limitation. While certain embodiments have been shown and described, it will be apparent to those skilled in the art that additions, changes, and modifications may be made without departing from the broader aspects of the technological contribution. The actual scope of the protection sought is intended to be defined in the following claims.

What is claimed is:

1. A device comprising:
   a main body including an inlet passage, an outlet passage, and a body portion, the body portion in fluid communication with the inlet passage and the outlet passage and defining a filter chamber for receiving a filter;
   a valve housing having a solenoid socket for attaching a solenoid and a pressure regulator socket for attaching a pressure regulator;
   a diaphragm defining at least in part a pressure chamber within the valve housing, the pressure chamber in fluid communication with a valve housing vent passage to selectively vent fluid to control movement of the diaphragm relative to a valve seat;
   an adapter between the body portion and the valve housing, the adapter having a first portion attached to the body portion, a second portion attached to the valve housing, and an adapter vent passage in fluid communication with the valve housing vent passage;
   wherein the adapter vent passage is positioned to direct fluid from the valve housing vent passage into the body portion downstream of the filter.

2. The device of claim 1, wherein the adapter vent passage is positioned to direct fluid from the valve housing vent passage into a portion of the filter chamber downstream of the filter between an outer wall of the filter chamber and the filter.

3. The device of claim 1, further comprising a flow tube coupled to the inlet passage and extending within the filter chamber towards the valve housing.

4. The device of claim 3, wherein the flow tube defines the valve seat.

5. The device of claim 1, wherein the adapter and the valve housing engage the diaphragm and secure the diaphragm in position when the adapter is attached to the valve housing.

6. The device of claim 1, wherein the valve housing vent passage includes a solenoid portion extending from the solenoid socket downstream to the pressure regulator socket and a pressure regulator portion extending downstream from the pressure regulator socket.

7. The device of claim 6, wherein the pressure regulator portion directs the vented fluid into the adapter vent passage.

8. The device of claim 1, wherein a top portion of the body portion is received within the adapter, and the adapter vent passage directs the vented fluid into a channel defined between an inner annular wall of the adapter and a wall of the body portion.

9. The device of claim 8 wherein the adapter defines an annular groove, and further comprises an o-ring positioned in the annular groove to engage the filter and prevent the fluid from the adapter vent passage from flowing to an upstream side of the filter.

10. The device of claim 1, wherein the adapter includes first threading that cooperates with second threading of the body portion to removably attach the adapter to the body portion.

11. The device of claim 2, wherein unthreading the adapter from the body portion provides access to the filter chamber to install or remove the filter.

12. The device of claim 1, wherein in an operational state of the device the pressure regulator regulates pressure of fluid to be discharged from the device to within a preset pressure range by controlling movement of the diaphragm relative to the valve seat.

13. A device comprising:
    a main body including a base portion having an inlet passage and an outlet passage and a body portion extending from the base portion, the body portion in fluid communication with the inlet passage and the outlet passage and including a filter chamber for receiving a filter;
    a flow tube extending within the filter chamber from the inlet passage, the flow tube defining a valve seat;
    a valve assembly couplable to the body portion, and having:
        a housing defining a solenoid socket for attaching a solenoid and a pressure regulator socket for attaching a pressure regulator,
        a valve having a diaphragm,
        a pressure chamber between the valve and the housing, and
        a vent passage extending between the pressure chamber, the solenoid socket, the pressure regulator socket, and the main body,
    wherein, in an operational state of the device, venting of fluid through the vent passage is controlled by the solenoid and the pressure regulator to control movement of the diaphragm relative to the valve seat.

14. The device of claim 13, wherein the vent passage leads to a portion of the filter chamber downstream of the filter and the valve seat.

15. The device of claim 14, wherein the portion of the filter chamber is between an outer wall of the body portion and the filter.

16. The device of claim 13, wherein the valve assembly includes first threading that cooperates with second threading of the body portion to removably attach the valve assembly to the body portion in order to access the filter chamber to insert or remove the filter.

17. The device of claim 13, comprising the filter received in the filter chamber, the flow tube attached to the filter and extending within an interior of the filter.

18. The device of claim 13, wherein in the operational state of the device the pressure regulator regulates pressure of fluid to be discharged from the device to within a preset pressure range by controlling a distance the diaphragm moves from the valve seat.

19. The device of claim 13, further comprising one or more pressure sensors for monitoring a pressure differential across a filter disposed in the filter chamber.

20. A valve assembly comprising:
    a valve housing, an inflow passage and an outflow passage;
    a valve intermediate the inflow passage and the outflow passage, the valve having a closed position where fluid flow from the inflow passage to the outflow passage is blocked and an open position where fluid flow from the inflow passage to the outflow passage is permitted;
    a pressure chamber disposed on one side of the valve within the valve housing, a pressure chamber entrance passage permitting fluid to flow from the inflow passage into the pressure chamber to build up pressure in the pressure chamber;
    an opening defined by the valve housing at the pressure chamber; and
    a bleed cap having at least a portion positioned exterior of the valve housing, the bleed cap rotatable between a closed position where the bleed cap blocks flow of fluid from the pressure chamber out the opening and an open position where the bleed cap does not block flow of fluid from the pressure chamber out the opening,
    wherein in the open position fluid from the pressure chamber flows through a tortuous pathway between the bleed cap and the valve housing, the tortuous pathway reducing a velocity of the fluid as it is discharged from the bleed cap.

21. The valve assembly of claim 20, wherein the bleed cap includes grooves on a lower surface thereof defining in part the tortuous pathway.

22. The valve assembly of claim 21, wherein the valve housing includes ribs sized and positioned to correspond to the grooves and defining in part the tortuous pathway.

* * * * *